(12) United States Patent
Hiwatashi

(10) Patent No.: US 8,202,927 B2
(45) Date of Patent: Jun. 19, 2012

(54) NEAR-INFRARED ABSORBING COMPOSITION AND NEAR-INFRARED ABSORBING FILTER

(75) Inventor: Yuka Hiwatashi, Tokyo-to (JP)

(73) Assignee: Dai Nippon Printing Co., Ltd., Tokyo-to (JP)

(*) Notice: Subject to any disclaimer, the term of this patent is extended or adjusted under 35 U.S.C. 154(b) by 27 days.

(21) Appl. No.: 12/670,894

(22) PCT Filed: Aug. 8, 2008

(86) PCT No.: PCT/JP2008/064312
§ 371 (c)(1),
(2), (4) Date: Jan. 27, 2010

(87) PCT Pub. No.: WO2009/020207
PCT Pub. Date: Feb. 12, 2009

(65) Prior Publication Data
US 2010/0210772 A1 Aug. 19, 2010

(30) Foreign Application Priority Data
Aug. 9, 2007 (JP) .................. 2007-208422

(51) Int. Cl.
*C08K 3/10* (2006.01)
(52) U.S. Cl. ........................................ 524/406
(58) Field of Classification Search .................... 524/406
See application file for complete search history.

(56) References Cited

FOREIGN PATENT DOCUMENTS

| | | | |
|---|---|---|---|
| JP | 2002-311843 | A | 10/2002 |
| JP | 2005-272588 | A | 10/2005 |
| JP | 2006-154516 | A | 6/2006 |
| JP | 2007-041575 | A | 2/2007 |
| JP | 2007-095971 | A | 4/2007 |
| JP | 2008-209486 | A | 9/2008 |
| JP | 2008-211010 | A | 9/2008 |
| WO | 2005/037932 | A1 | 4/2005 |
| WO | 2006/077960 | A1 | 7/2006 |

OTHER PUBLICATIONS

International Search Report: PCT/JP2008/064312.

*Primary Examiner* — Peter Szekely
(74) *Attorney, Agent, or Firm* — Ladas & Parry LLP

(57) ABSTRACT

A near-infrared absorbing composition which is imparted with a function of absorbing near-infrared rays emitted from a display such as a plasma display, capable of reducing the number of lamination steps resulting in excellent production efficiency, capable of resisting to color non-uniformity of a filter even after a long-term use at high temperature or high humidity, and capable of preventing an increase in haze, and a near-infrared absorbing filter having a near-infrared absorbing layer comprising the composition. The near-infrared absorbing composition has composite tungsten oxide fine particles which are dispersed in a resin including carboxyl groups and has an acid number of 0.6 or more and 30 or less.

9 Claims, 4 Drawing Sheets

NEAR-INFRARED ABSORBING COMPOSITION AND NEAR-INFRARED ABSORBING FILTER

TECHNICAL FIELD

The present invention relates to a near-infrared absorbing composition having a function of absorbing near-infrared rays generated from a display (image displaying device) such as a PDP (plasma display panel) and a near-infrared absorbing filter produced by using the same.

BACKGROUND ART

With the increasing sophistication and use of electrical and electronic equipment in recent years, electro-magnetic interference (EMI) has been increased, and electromagnetic waves are generated even from a display such as a cathode ray tube (CRT) and a plasma display panel (PDP). Plasma display panels are an assembly of a glass having a data electrode and a fluorescent layer, and a glass having a transparent electrode. When powered on, they generate a large quantity of electromagnetic waves and near-infrared rays.

In the description of the present invention, the term "electromagnetic waves" is used in referring to electromagnetic waves with frequencies below the frequency range of approximately MHz to GHz, and is distinguished from infrared rays, visible rays and ultraviolet rays.

Near-infrared rays generated from the front surface of a plasma display in the wavelength range from 800 to 1,100 nm can cause other devices such as VTR to malfunction; therefore, it is demanded to shield such rays. In general, a near-infrared absorbing filter (optical filter) having a function of absorbing near-infrared rays is provided on the observer-side surface of a PDP to shield near-infrared rays generated.

The near-infrared absorbing filter normally comprises a near-infrared absorbing, pressure-sensitive adhesive layer. This layer comprises a near-infrared absorbing agent having a near-infrared absorption function and a pressure-sensitive adhesive having a pressure-sensitive adhesive function for bonding the filter to the body or front panel of a display. Adhesives comprising organic near-infrared absorbing agents (dyes) have been studied for use as the near-infrared absorbing, pressure-sensitive adhesive (Patent Literature 1).

Patent Literature 1: Japanese Patent Application Laid-Open (JP-A) No. 2005-272588
Patent Literature 2: JP-A No. 2002-311843
Patent Literature 3: JP-A No. 2006-154516
Patent Literature 4: JP-A No. 2007-095971

SUMMARY OF INVENTION

Technical Problem

Patent Literature 2 discloses an electromagnetic wave shielding sheet, wherein an absorbing agent, which absorbs a specific wavelength of visible light and/or near-infrared rays, is contained in an adhesive layer disposed between the substrate of the electromagnetic wave shielding sheet and a metal mesh, a planarizing layer for planarizing the convexoconcaves of the metal mesh, or an adhesive layer adhering to a glass substrate, and wherein an organic near-infrared absorbing agent is contained in an area in contact with the glass substrate, the electroconductive metal mesh, or the adhesive layer disposed between the electroconductive mesh layer and the substrate of the electromagnetic wave shielding sheet. In this case, there is a problem that the near-infrared absorbing agent is likely to deteriorate. This is due to the reaction of the organic near-infrared absorbing agent with alkali metal ions derived from the glass substrate, such as sodium ions, metal atoms (or metal ions) derived from the electroconductive mesh, such as copper, urethane bonds derived from an urethane-based adhesive layer. There is also a problem that when a resin substrate is inserted between the glass substrate and the organic near-infrared absorbing agent to avoid contact of the glass substrate with the organic near-infrared absorbing agent, an adhesive for bonding the glass substrate to the resin substrate is required, thereby increasing the number of steps and cost of raw materials. Furthermore, when an organic near-infrared absorbing agent is contained in a conventionally-used acrylic pressure-sensitive adhesive layer capable of functioning as a pressure-sensitive adhesive layer, there is a problem that the near-infrared absorbing agent reacts with the adjacent layers, and the reaction promotes changes in the spectral characteristics of the resulting optical filter. Therefore, it has been difficult to realize a structure in which a near-infrared absorbing agent is contained in a pressure-sensitive adhesive layer to simplify the structure of a layer, and the pressure-sensitive adhesive layer is in contact with a metal mesh layer or a glass substrate.

On the other hand, Patent Literature 3 discloses a near-infrared absorbing filter for PDP, which is prepared by using composite tungsten oxide fine particles. However, when composite tungsten oxide fine particles are contained in a layer which is provided as a relatively thin layer such as antireflection layer, a problem often arises because composite tungsten oxide fine particles are a pigment, that the density of the fine particles in the layer is increased, which leads to an increase in haze.

When a pressure-sensitive adhesive layer containing composite tungsten oxide fine particles is present in an area which is in contact with a glass substrate or metal such as an electroconductive mesh layer, the adhesion of the pressure-sensitive adhesive to the glass substrate or metal becomes increasingly important.

Patent Literature 4 discloses an electromagnetic wave shielding sheet in which at least a copper mesh layer, a pressure-sensitive adhesive layer and an adherend layer are sequentially formed on a first surface of a transparent substrate, which pressure-sensitive adhesive layer containing a pressure-sensitive adhesive with an acid number and an antioxidant. The higher the acid number of the pressure-sensitive adhesive, the more the acid groups in the pressure-sensitive adhesive, such as carboxyl groups, sulfo groups, acrylic acid groups, methacrylic acid groups and phosphate groups, resulting in an increase in the adhesion of the pressure-sensitive adhesive. However, it becomes easier for the pressure-sensitive adhesive to absorb moisture in the air, and the absorbed moisture can rust the metal which is in contact with the adhesive. Therefore, it is necessary for the pressure-sensitive adhesive to additionally contain an antioxidant to obtain both of the adhesion to the glass substrate or metal and prevention of rust on the metal.

The present invention has been made to solve the above problems. A first object of the present invention is to provide a near-infrared absorbing composition which is capable of providing both of adhesion to a glass substrate or metal and prevention of rust on metal. A second object of the present invention is to provide a near-infrared absorbing composition which is capable of increasing the dispersibility of composite tungsten oxide fine particles in resins and which has excellent removability. A third object of the present invention is to provide a near-infrared absorbing filter having a near-infrared absorbing layer which resists to changes in spectral characteristics attributed to deterioration of a light absorbing agent even after a long-term use, especially even after a long-term use at high temperature and high humidity, and to provide a near-infrared absorbing composition capable of forming such a the near-infrared absorbing layer.

Solution to Problem

The near-infrared absorbing composition of the present invention is a near-infrared absorbing composition in which, as a near-infrared absorbing agent, composite tungsten oxide fine particles represented by the general formula $M_xW_yO_z$, wherein element M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I; W is tungsten; O is oxygen; and $0.001 \leq x/y \leq 1.1$ and $2.2 \leq z/y \leq 3.0$, are dispersed in a resin which comprises carboxyl groups and has an acid number of 0.6 or more and 30 or less.

The composite tungsten oxide fine particles used in the present invention as a near-infrared absorbing agent have high heat resistance, high moisture resistance and high light resistance. Even if the fine particles are added to a layer which is in direct contact with a glass substrate, no deterioration of the dye is caused by sodium ions derived from the glass. In addition, the composite tungsten oxide fine particles can absorb the entire region of the near-infrared light of wavelength 800 to 1,100 nm which is generated from the front surface of a display only by the particles themselves, so that it is not necessary to use an organic near-infrared absorbing agent together with the particles, which is more likely to deteriorate.

Accordingly, when the near-infrared absorbing composition of the present invention is used in the near-infrared absorbing layer of an optical filter, the optical filter can resist to color non-uniformity attributed to deterioration of a near-infrared absorbing agent even after a long-term use, especially even after a long-term use at high temperature or high humidity. In addition, it is not necessary to keep the near-infrared adsorbing layer away from, for example, a glass substrate such as the surface of a display or an adhesive layer between the substrates of optical filters to prevent the near-infrared absorbing agent from deterioration.

Also, by using a resin having carboxyl groups and an acid number of 0.6 or more and 30 or less for the near-infrared absorbing composition of the present invention, the dispersibility of composite tungsten oxide fine particles in the resin becomes excellent, thereby preventing an increase in haze. Furthermore, in the case of using the near-infrared absorbing composition containing the above-specified resin as a pressure-sensitive adhesive, it is possible to achieve removability having reworkability that makes it possible to perform the following steps of attaching a near-infrared absorbing layer (pressure-sensitive adhesive layer) comprising the near-infrared absorbing composition onto a substrate or a different layer, detaching the pressure-sensitive adhesive layer therefrom and reattaching the same so as to prevent the pressure-sensitive adhesive layer from wrinkling or attach the pressure-sensitive adhesive layer in the correct position.

Moreover, by using the above-specified resin, the near-infrared absorbing composition of the present invention can achieve both of adhesion to a glass substrate or metal and prevention of rust on metal.

Therefore, it is now possible to put a composition like the near-infrared absorbing composition of the present invention into practical use, which is capable of providing both of adhesion to a glass substrate or metal and prevention of rust on metal, as well as having a near-infrared absorption function.

In the near-infrared absorbing composition of the present invention, the resin is preferably an acrylic resin, so that it is easy to obtain transparency.

In the near-infrared absorbing composition of the present invention, the resin is preferably a pressure-sensitive adhesive, so that it is possible to obtain adhesion that makes it possible to adhere to the body or front panel of a display.

In the near-infrared absorbing composition of the present invention, the acid number is preferably 1 or more and 19 or less, from the viewpoint of increasing the dispersibility of the composite tungsten oxide fine particles in said resin and preventing an increase in haze.

In the near-infrared absorbing composition of the present invention, an average dispersed particle diameter of the composite tungsten oxide fine particles is preferably 800 nm or less, from the viewpoint of increasing transmittance in the visible range and realizing a decrease in haze.

In the near-infrared absorbing composition of the present invention, the composite tungsten oxide fine particles preferably have any one or more of a hexagonal crystal structure, a tetragonal crystal structure and a cubic crystal structure, from the viewpoint of increasing the durability of optical characteristics.

In the near-infrared absorbing composition of the present invention, element M in the general formula representing the composite tungsten oxide fine particles, $M_xW_yO_z$, is preferably cesium (Cs), and the composite tungsten oxide fine particles preferably have a hexagonal crystal structure, from the viewpoint of increasing the durability of optical characteristics.

In the near-infrared absorbing composition of the present invention, surfaces of the composite tungsten oxide fine particles are preferably covered with an oxide comprising one or more elements selected from Si, Ti, Zr and Al, from the viewpoint of increasing the durability of optical characteristics.

In the near-infrared absorbing composition of the present invention, the near-infrared absorbing composition preferably further comprises zirconium oxide fine particles having a smaller average particle diameter than that of the composite tungsten oxide fine particles, from the viewpoint of eliminating a bluish color of reflected color tone.

The near-infrared absorbing filter of the present invention is characterized by having a near-infrared absorbing layer comprising the near-infrared absorbing composition of the present invention.

According to the present invention, it is possible to provide a near-infrared absorbing filter which resists to changes in spectral characteristics attributed to deterioration of the near-infrared absorbing agent even after a long-term use, especially even after a long-term use at high temperature and high humidity, and which has high transparency.

Advantageous Effects of Invention

The near-infrared absorbing composition of the present invention can prevent an increase in haze because the dispersibility of composite tungsten oxide fine particles in the resin becomes excellent by using a resin having carboxyl groups and an acid number in a specific range. Furthermore, in the case of using the near-infrared absorbing composition containing the above-specified resin as a pressure-sensitive adhesive, it is possible to achieve removability having reworkability. Also, by using the above-specified resin, the near-infrared absorbing composition of the present invention can achieve both of adhesion to a glass substrate or metal and prevention of rust on metal.

Moreover, by having a near-infrared absorbing layer comprising the near-infrared absorbing composition, the near-infrared absorbing filter of the present invention can resist to color non-uniformity caused by changes in spectral characteristics attributed to deterioration of the near-infrared absorbing agent, or color non-uniformity attributed to discoloration of the adhesive even after a long-term use, especially even after a long-term use at high temperature or high humidity.

REFERENCE SIGNS LIST

Figure 1:
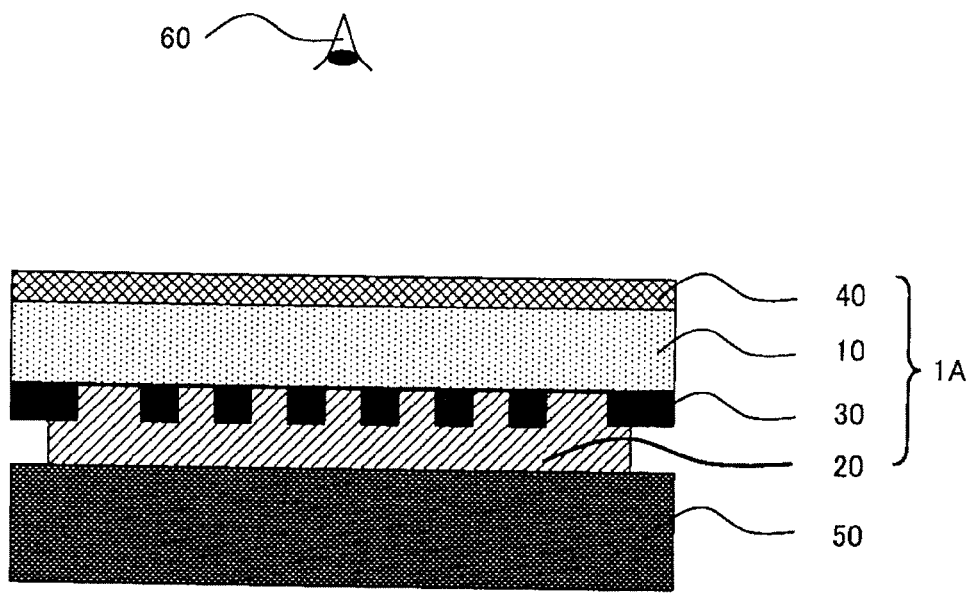
FIG. 1 is a sectional view schematically showing an example of the near-infrared absorbing filter of the present invention.

1A: near-infrared absorbing filter; 1B: near-infrared absorbing filter; 1C: near-infrared absorbing filter; 1D: near-infrared absorbing filter; 10: transparent substrate; 20: near-infrared absorbing layer (pressure-sensitive adhesive layer); 30: electroconductive mesh layer; 31: transparent electroconductive layer; 40: surface protective layer; 50: plasma display panel; 60: observer; 70: front panel; 80: longitudinal direction (running direction); 90: electroconductive mesh openings

DESCRIPTION OF EMBODIMENTS

The near-infrared absorbing composition of the present invention is a near-infrared absorbing composition in which, as a near-infrared absorbing agent, composite tungsten oxide fine particles represented by the general formula $M_xW_yO_z$, wherein element M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I; W is tungsten; O is oxygen; and $0.001 \leq x/y \leq 1.1$ and $2.2 \leq z/y \leq 3.0$, are dispersed in a resin which comprises carboxyl groups and has an acid number of 0.6 or more and 30 or less.

The composite tungsten oxide fine particles used in the present invention as a near-infrared absorbing agent have high heat resistance, high moisture resistance and high light resistance. Especially, even if the fine particles are contained in a layer which is in contact with an electroconductive metal mesh layer, glass substrate of the front panel of a display, or adhesive layer having urethane bonds, the composite tungsten oxide fine particles resist to deterioration of characteristics caused by reaction with these layers which can trigger deterioration of conventional organic near-infrared absorbing dyes. In addition, the composite tungsten oxide fine particles can absorb the entire region of the near-infrared light of wavelength 800 to 1,100 nm which is generated from the front surface of a display only by the particles themselves, so that it is not necessary to use an organic near-infrared absorbing agent together with the particles, which is more likely to deteriorate. Accordingly, when the near-infrared absorbing composition of the present invention is used to form the near-infrared absorbing layer of an optical filter, the optical filter can resist to color non-uniformity attributed to deterioration of the near-infrared absorbing agent even after a long-term use, especially even after a long-term use at high temperature or high humidity. In addition, it is not necessary to keep a layer containing the near-infrared absorbing agent away from, for example, a glass substrate such as the surface of a display or an adhesive layer between the substrates of an optical layer to prevent the near-infrared absorbing agent from deterioration.

Also, a resin having carboxyl groups is used in the near-infrared absorbing composition of the present invention, and the acid number of the resin is set to 0.01 or more and 100 or less, preferably 0.6 or more and 30 or less, more preferably 1 or more and 19 or less, and still more preferably 4 or more and 7 or less. By giving the resin an acid number of 0.6 or more, the dispersibility of composite tungsten oxide fine particles in the resin becomes excellent, thereby preventing an increase in haze. Also, by giving the resin an acid number of 30 or less, it is possible to achieve removability having reworkability. In particular, it is preferable to give the resin an acid number of 4 or more and 7 or less because an increased dispersibility in the resin is imparted to the composite tungsten oxide fine particles, which leads to an increased near-infrared absorption function. Moreover, by giving the resin an acid number in the above range, the near-infrared absorbing composition of the present invention can achieve both of adhesion to a glass substrate or metal and prevention of rust on metal. Therefore, it is now possible to put a composition like the near-infrared absorbing composition of the present invention into practical use, which is capable of providing both of adhesion to a glass substrate or metal and prevention of rust on metal, as well as having a near-infrared absorption function.

It is to be noted that the acid number of the resin discussed herein refers to an amount of all the acidic components (such as carboxyl groups and sulfo groups) contained in a carboxyl-group containing resin of 1 g, and it is represented by the milligram amount of potassium hydroxide which is required to neutralize all the acidic components. The method of measuring the acid number may be a titration method, such as a method defined by JIS K2501, for example.

In the case where the resin is an acrylic pressure-sensitive adhesive, the acid number of the resin corresponds to the number of carboxyl groups contained in the resin of 1 g.

Hereinafter, the composition, production method, and properties of the near-infrared absorbing composition used in the present invention, and the near-infrared absorbing filter prepared by using the near-infrared absorbing composition will be described in this order.

Composition of the Near-Infrared Absorbing Composition Composite Tungsten Oxide Fine Particles In the present invention, the composite tungsten oxide fine particles represented by the general formula MxWyOz can function as a near-infrared absorbing agent, wherein element M is one or more elements selected from H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I; W is tungsten; O is oxygen; and $0.001 \leq x/y \leq 1.1$ and $2.2 \leq z/y \leq 3.0$. Therefore, the near-infrared absorbing composition of the present invention can exhibit absorbance of light in the near-infrared region which is generated when a plasma display panel emits light using xenon gas discharge, that is, in the wavelength range from 800 to 1,100 nm, and the transmittance of near-infrared light in this region is preferably 20% or less, more preferably 15% or less.

The composite tungsten oxide fine particles represented by the general formula MxWyOz are imparted with excellent durability when they have a hexagonal crystal structure, a tetragonal crystal structure, a cubic crystal structure; thus, the composite tungsten oxide fine particles preferably have one or more crystal structures selected from a hexagonal crystal structure, a tetragonal crystal structure and a cubic crystal structure. For example, in the case of composite tungsten oxide fine particles having a hexagonal crystal structure, as an example thereof, there may be mentioned composite tungsten oxide fine particles which contain, as preferred element M, one or more elements selected from the elements of Cs, Rb, K, Tl, In, Ba, Li, Ca, Sr, Fe and Sn. In particular, cesium (Cs) is preferred as element M from the viewpoint of durability.

In this case, the added amount x of element M is preferably 0.001 or more and 1.0 or less, more preferably around 0.33. This is because the value of x, which is theoretically calculated from the hexagonal crystal structure, is 0.33, and preferable optical characteristics can be obtained when the added amount is around 0.33. On the other hand, the abundance z of oxygen is preferably 2.2 or more and 3.0 or less. For example, there may be mentioned $Cs_{0.33}WO_3$, $Rb_{0.33}WO_3$, $K_{0.33}WO_3$ and $Ba_{0.33}WO_3$, while composite tungsten oxide fine particles having x and z in the above ranges can provide usable near-infrared absorbing characteristics.

Composite tungsten oxide fine particles of this type may be used alone. It is also preferable to use them in combination.

Surfaces of the composite tungsten oxide fine particles are preferably covered with an oxide comprising one or more elements selected from Si, Ti, Zr and Al, from the viewpoint of increasing weather resistance.

An average dispersed particle diameter of the composite tungsten oxide fine particles is preferably 800 nm or less, more preferably 200 nm or less, and particularly preferably 100 nm or less, from the viewpoint of transparency in the case of using the near-infrared absorbing composition of the present invention as a near-infrared absorbing layer. It is to be noted that the average dispersed particle diameter discussed herein refers to a volume average particle diameter and may be measured with the use of a particle size/particle diameter distribution apparatus (such as Nanotrac Particle Size Analyzer manufactured by NIKKISO Co., Ltd.)

An average particle diameter of the composite tungsten oxide fine particles is preferably 40 to 200 nm, more preferably 40 to 80 nm, particularly preferably 40 to 60 nm. If the average particle diameter is less than 40 nm, the near-infrared absorbing ability of the fine particles becomes insufficient. If the average particle diameter exceeds 200 nm, a white turbidity is caused by Mie scattering, which leads to a decrease in contrast.

It is to be noted that measurement of the average particle diameter was carried out by taking a picture of the composite tungsten oxide fine particles with a transmission electron microscope (H-7100FA manufactured by Hitachi, Ltd., acceleration voltage of 100 kV), selecting at random 50 composite tungsten oxide fine particles for example, measuring the particle diameters of the 50 particles, and averaging them. If the shape of the particles is not spherical, the particles are measured for the longer diameter to calculate the average particle diameter.

A content of the composite tungsten oxide fine particles is not particularly limited, and is preferably 1 to 25% by weight in the resin. If the content is 1% by weight or more, it is possible to exhibit a sufficient near-infrared absorption function. If the content is 25% by weight or less, it is possible to transmit an adequate amount of visible light.

Resin

In the near-infrared absorbing composition of the present invention, the resin is an adhesive and/or non-adhesive resin having carboxyl groups. The resin may be appropriately selected and used in view of the dispersibility, film-forming ability and transparency of the composite tungsten oxide fine particles and other components.

No particular limitation is imposed on the transparency of the resin as long as the transparency is of such a degree that a person finds it transparent. Preferred transparency is that with a haze value of 5 or less, which value conforming with JIS K7136, and particularly preferred transparency is that with a haze value of 3 or less.

The resin may be either organic or inorganic material as long as the resin can disperse the composite tungsten oxide fine particles.

As the organic material, there may be used either a non-polymerizable resin which has no polymerization reaction, or a polymerizable resin such as a photocurable resin and thermosetting resin.

As the non-polymerizable resin, for example, there may be used (meth)acrylic resin, urethane resin, fluorine resin, polycarbonate resin, polyester resin or the like. Among them, (meth)acrylic resin is particularly preferred because of its excellent transparency.

The acrylic resin is a polymer having at least a repeating unit derived from a (meth)acrylic monomer, such as (meth)acrylic acid and their derivatives.

It is to be noted that in the present invention, (meth)acrylic denotes acrylic and/or methacrylic; (meth)acrylic acid denotes acrylic acid and/or methacrylic acid; (meth)acrylamide denotes acrylamide and/or methacrylamide; (meth)acrylate denotes acrylate and/or methacrylate; (meth)acrylonitrile denotes acrylonitrile and/or methacrylonitrile; and (co)polymer denotes polymer and/or copolymer.

As the (meth)acrylic monomer, there may be mentioned a (meth)acrylic acid ester monomer such as a (meth)acrylic acid alkyl ester monomer, (meth)acrylic acid, etc.

Examples of the (meth)acrylic acid alkyl ester monomer include methyl(meth)acrylate, ethyl(meth)acrylate, n-propyl (meth)acrylate, sec-propyl(meth)acrylate, n-butyl(meth) acrylate, sec-butyl(meth)acrylate, tert-butyl(meth)acrylate, isoamyl(meth)acrylate, n-hexyl(meth)acrylate, cyclohexyl (meth)acrylate, n-octyl(meth)acrylate, isooctyl(meth)acrylate, 2-ethylhexyl(meth)acrylate, undecyl(meth)acrylate and lauryl(meth)acrylate.

As the photocurable resin, there may be used a photocurable resin in which an ethylenic double bond-containing group such as a vinyl group and a (meth)acrylic group is introduced into the chemical skeleton of the above non-polymerizable resin, or a composition prepared by mixing the above non-polymerizable resin with a polyfunctional monomer or oligomer having two or more ethylenic double bond-containing groups in a molecule thereof.

Among polyfunctional monomers or oligomers, as bifunctional monomers, there may be mentioned diacrylates or dimethacrylates of alkylene glycol, such as ethylene glycol, propylene glycol and hexanediol; and diacrylates or dimethacrylates of polyalkylene glycol, such as polyethylene glycol and polypropylene glycol, for example.

As trifunctional monomers, there may be mentioned triacrylates or trimethacrylates of trivalent or higher polyalcohol, such as trimethylolpropane triacrylate, trimethylolpropane trimethacrylate, pentaerythritol triacrylate and pentaerythritol trimethacrylate, for example.

As tetrafunctional or higher polyfunctional monomers, there may be mentioned pentaerythritol tetraacrylate, pentaerythritol tetramethacrylate, dipentaerythritol pentaacrylate, dipentaerythritol hexaacrylate and dipentaerythritol hexamethacrylate, for example.

As the thermosetting organic material, there may be used a thermosetting resin in which an epoxy-containing group such as a glycidyl group is introduced into the chemical skeleton of the above non-polymerizable resin, or a composition prepared by mixing the above non-polymerizable resin with a polyfunctional epoxy resin having two ore more epoxy-containing groups in a molecule thereof.

A total content of the organic resin is preferably 40 to 99% by weight, more preferably 50 to 98% by weight, with respect to the solid in the whole near-infrared absorbing layer.

On the other hand, no limitation is imposed on the inorganic material as long as it is a component which has high light transmittance in the visible light range. There may be used a conventionally-known organopolysiloxane, liquid glass (a concentrated aqueous solution of sodium silicate) or the like, for example.

As the organopolysiloxane, for example, there may be mentioned (1) an organopolysiloxane with a large strength prepared by performing hydrolysis and polycondensation on chlorosilane, alkoxysilane or the like by sol-gel reaction, and (2) an organopolysiloxane prepared by crosslinking a reactive silicone which has excellent water-repellency or oil-repellency.

In the case of (1), the organopolysiloxane is mainly comprised of a hydrolysis-condensation product of a silicon compound represented by the general formula $Y_nSiX_{4-n}$ (wherein n=1 to 3) or a hydrolysis-cocondensation product of two or more kinds of silicon compound represented by the same general formula. In this general formula, Y is an alkyl group, a fluoroalkyl group, a vinyl group, an amino group or an epoxy group, and x is a halogen, a methoxyl group, an ethoxyl group or an acetyl group.

Specific examples thereof include methyltrichlorosilane, methyltribromosilane, methyltrimethoxysilane, methyltriethoxysilane, methyltriisopropoxysilane, methyltri-t-butoxysilane; ethyltrichlorosilane, ethyltribromosilane, ethyltrimethoxysilane, ethyltriethoxysilane, ethyltriisopropoxysilane, ethyltri-t-butoxysilane; n-propyltrichlorosilane, n-propyltribromosilane, n-propyltrimethoxysilane, n-propyltriethoxysilane, n-propyltriisopropoxysilane, n-propyltri-t-butoxysilane; n-hexyltrichlorosilane, n-hexyltribromosilane, n-hexyltrimethoxysilane, n-hexyltriethoxysilane, n-hexyltriisopropoxysilane, n-hexyltri-t-butoxysilane; n-decyltrichlorosilane, n-decyltribromosilane, n-decyltrimethoxysilane, n-decyltriethoxysilane, n-decyltriisopropoxysilane, n-decyltri-t-butoxysilane; n-octadecyltrichlorosilane, n-octadecyltribromosilane, n-octadecyltrimethoxysilane, n-octadecyltriethoxysilane, n-octadecyltriisopropoxysilane, n-octadecyltri-t-butoxysilane; phenyltrichlorosilane, phenyltribromosilane, phenyltrimethoxysilane, phenyltriethoxysilane, phenyltriisopropoxysilane, phenyltri-t-butoxysilane; tetrachlorosilane, tetrabromosilane, tetramethoxysilane, tetraethoxysilane, tetrabutoxysilane, dimethoxydiethoxysilane; dimethyldichlorosilane, dimethyldibromosilane, dimethyldimethoxysilane, dimethyldiethoxysilane; diphenyldichlorosilane, diphenyldibromosilane, diphenyldimethoxysilane, diphenyldiethoxysilane; phenylmethyldichlorosilane, phenylmethyldibromosilane, phenylmethyldimethoxysilane, phenylmethyldiethoxysilane; trichlorohydrosilane, tribromohydrosilane, trimethoxyhydrosilane, triethoxyhydrosilane, triisopropoxyhydrosilane, tri-t-butoxyhydrosilane; vinyltrichlorosilane, vinyltribromosilane, vinyltrimethoxysilane, vinyltriethoxysilane, vinyltriisopropoxysilane, vinyltri-t-butoxysilane; trifluoropropyltrichlorosilane, trifluoropropyltribromosilane, trifluoropropyltrimethoxysilane, trifluoropropyltriethoxysilane, trifluoropropyltriisopropoxysilane, trifluoropropyltri-t-butoxysilane; γ-glycidoxypropylmethyldimethoxysilane, γ-glycidoxypropylmethyldiethoxysilane, γ-glycidoxypropyltrimethoxysilane, γ-glycidoxypropyltriethoxysilane, γ-glycidoxypropyltriisopropoxysilane, γ-glycidoxypropyltri-t-butoxysilane; γ-methacryloxypropylmethyldimethoxysilane, γ-methacryloxypropylmethyldiethoxysilane, γ-methacryloxypropyltrimethoxysilane, γ-methacryloxypropyltriethoxysilane, γ-methacryloxypropyltriisopropoxysilane, γ-methacryloxypropyltri-t-butoxysilane; γ-aminopropylmethyldimethoxysilane, γ-aminopropylmethyldiethoxysilane, γ-aminopropyltrimethoxysilane, γ-aminopropyltriethoxysilane, γ-aminopropyltriisopropoxysilane, γ-aminopropyltri-t-butoxysilane; γ-mercaptopropylmethyldimethoxysilane, γ-mercaptopropylmethyldiethoxysilane, γ-mercaptopropyltrimethoxysilane, γ-mercaptopropyltriethoxysilane, γ-mercaptopropyltriisopropoxysilane, γ-mercaptopropyltri-t-butoxysilane; β-(3,4-epoxycyclohexyl)ethyltrimethoxysilane, β-(3,4-epoxycyclohexyl)ethyltriethoxysilane; partial hydrolysates thereof; and a mixture thereof.

As the resin, a polysiloxane having a fluoroalkyl group is particularly preferably used. In particular, there may be mentioned a hydrolysis-condensation product of one of the following fluoroalkylsilanes or a hydrolysis-cocondensation product of two or more of the following fluoroalkylsilanes, and there may be used those which are generally known as a fluorine-contained silane coupling agent:

$CF_3(CF_2)_3CH_2CH_2Si(OCH_3)_3$
$CF_3(CF_2)_5CH_2CH_2Si(OCH_3)_3$
$CF_3(CF_2)_7CH_2CH_2Si(OCH_3)_3$
$CF_3(CF_2)_9CH_2CH_2Si(OCH_3)_3$
$(CF_3)_2CF(CF_2)_4CH_2CH_2Si(OCH_3)_3$
$(CF_3)_2CF(CF_2)_6CH_2CH_2Si(OCH_3)_3$
$(CF_3)_2CF(CF_2)_8CH_2CH_2Si(OCH_3)_3$
$CF_3(C_6H_4)C_2H_4Si(OCH_3)_3$
$CF_3(CF_2)_3(C_6H_4)C_2H_4Si(OCH_3)_3$
$CF_3(CF_2)_5(C_6H_4)C_2H_4Si(OCH_3)_3$
$CF_3(CF_2)_7(C_6H_4)C_2H_4Si(OCH_3)_3$
$CF_3(CF_2)_3CH_2CH_2SiCH_3(OCH_3)_2$
$CF_3(CF_2)_5CH_2CH_2SiCH_3(OCH_3)_2$
$CF_3(CF_2)_7CH_2CH_2SiCH_3(OCH_3)_2$
$CF_3(CF_2)_9CH_2CH_2SiCH_3(OCH_3)_2$
$(CF_3)_2CF(CF_2)_4CH_2CH_2SiCH_3(OCH_3)_2$
$(CF_3)_2CF(CF_2)_6CH_2CH_2SiCH_3(OCH_3)_2$ (CF$_3$)$_2$CF(CF$_2$)$_8$CH$_2$CH$_2$SiCH$_3$(OCH$_3$)$_2$
CF$_3$(C$_6$H$_4$)C$_2$H$_4$SiCH$_3$(OCH$_3$)$_2$
CF$_3$(CF$_2$)$_3$(C$_6$H$_4$)C$_2$H$_4$SiCH$_3$(OCH$_3$)$_2$
CF$_3$(CF$_2$)$_5$(C$_6$H$_4$)C$_2$H$_4$SiCH$_3$(OCH$_3$)$_2$
CF$_3$(CF$_2$)$_7$(C$_6$H$_4$)C$_2$H$_4$SiCH$_3$(OCH$_3$)$_2$
CF$_3$(CF$_2$)$_3$CH$_2$CH$_2$Si(OCH$_2$CH$_3$)$_3$
CF$_3$(CF$_2$)$_5$CH$_2$CH$_2$Si(OCH$_2$CH$_3$)$_3$
CF$_3$(CF$_2$)$_7$CH$_2$CH$_2$Si(OCH$_2$CH$_3$)$_3$
CF$_3$(CF$_2$)$_9$CH$_2$CH$_2$Si(OCH$_2$CH$_3$)$_3$
CF$_3$(CF$_2$)$_7$SO$_2$N(C$_2$H$_5$)C$_2$H$_4$CH$_2$Si(OCH$_3$)$_3$

By using the above-mentioned polysiloxane having a fluoroalkyl group as the resin, the water-repellency of a non-light irradiated area on a photocatalyst-containing layer can be significantly increased, thereby exhibiting a function of preventing adhesion of a coating composition for forming a black matrix or coloring layer.

As the reactive silicone discussed in (2), there may be mentioned a compound having a skeleton represented by the following chemical formula (1):

[Chemical formula 1]

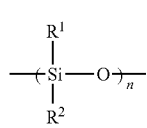

wherein n is an integer of 2 or more; $R^1$ and $R^2$ are each a substituted or unsubstituted alkyl, alkenyl, aryl or cyanoalkyl group having 1 to 10 carbon atoms; 40% by mole or less of the total is vinyl, phenyl or halogenated phenyl; $R^1$ and $R^2$ are preferably a methyl group so that the smallest surface energy is obtained; and the methyl group is preferably 60% by mole or more. A chain end or side chain thereof has at least one or more reactive groups such as hydroxy group in a molecular chain thereof.

In addition to said organopolysiloxane, a stable organosilicon compound such as dimethylpolysiloxane, which is not sensitive to crosslinking reaction, may be mixed with a binder.

The liquid glass is normally a highly viscous solution in which sodium silicate Na$_2$O.nSiO$_2$ (n=2 to 4) is dissolved in water. Common methods of producing liquid glass include a method (dry method) in which silica sand is mixed with sodium carbonate or sodium hydroxide and melted at a temperature of 1,100° C. or more to obtain a mass of glass (referred to as cullet), and in an autoclave, the resultant cullet is dissolved in water under pressure (at 5 to 7 kgf/cm$^2$ for several hours), followed by filtration; and a method (wet method) in which silica sand or siliceous white clay is mixed with sodium hydroxide, melted in an autoclave, and then subjected to filtration.

From the viewpoint of obtaining transparency, the resin used in the present invention is preferably an acrylic resin; moreover, from the viewpoint of obtaining adhesion to a glass substrate or metal, the resin is preferably a pressure-sensitive adhesive.

The pressure-sensitive adhesive is a kind of adhesive. Among adhesives, it refers to one which is capable of adhering simply with appropriate, generally, light hand pressure under room temperature, thanks to its surface adherence only. In general, physical energy or action such as heating, humidification and radiation irradiation (e.g., ultraviolet, electron beam, etc.) is not essential for the pressure-sensitive adhesive to exhibit its adhesive force, and chemical reaction such as polymerization reaction is also not essential. The pressure-sensitive adhesive is capable of maintaining with time a degree of adhesive force that has removability after adhering. In the present invention, one may be appropriately selected for use from those which are commonly used as conventionally-known adhesives, which has appropriate adherence (adhesive force), transparency, dispersibility and coatability, and which substantially changes no transmission spectrum of an optical filter.

Preferred as the adhesive are, for example, a natural rubber-based adhesive, synthetic rubber-based adhesive, acrylic resin—(hereinafter it may be abbreviated as acrylic) adhesive, polyvinyl ether-based adhesive, polyurethane resin-based adhesive, silicone resin-based adhesive. Particularly preferred is an acrylic-based adhesive.

Specific examples of the synthetic rubber-based adhesive include styrene-butadiene rubber, acrylonitrile-butadiene rubber, polyisobutylene rubber, isobutylene-isoprene rubber, styrene-isoprene block copolymer, styrene-butadiene block copolymer and styrene-ethylene-butylene block copolymer. Specific examples of the silicone resin-based adhesive include dimethylpolysiloxane, etc. These adhesives may be used solely or in combination of two or more kinds.

As a carboxyl group-containing acrylic-based adhesive, there may be mentioned a (meth)acrylic adhesive polymer which contains a repeating unit derived from (meth)acrylic acid and/or a different carboxyl group-containing monomer. Examples of which polymer include a copolymer which contains (meth)acrylic acid and is prepared by polymerization of two or more monomers including a different monomer(s) as needed, and a copolymer prepared by polymerization of two or more monomers including (meth)acrylate, a non-(meth)acrylate monomer containing a carboxyl group, and, as needed, a different monomer. In general, said carboxyl group-containing acrylic-based adhesive is a copolymer of a (meth)acrylic acid alkyl ester monomer which contains an alkyl group having about 1 to 18 carbon atoms and a monomer which contains a carboxyl group and an alkyl group having about 1 to 18 carbon atoms, or is a copolymer of two or more monomers including (meth)acrylic acid which contains an alkyl group having about 1 to 18 carbon atoms and (meth)acrylic acid alkyl ester monomer which contains an alkyl group having about 1 to 18 carbon atoms.

As a carboxyl group-containing monomer which will be the repeating unit of said acrylic-based adhesive, there may be mentioned a carboxyl group-containing vinyl monomer such as (meth)acrylic acid, itaconic acid, crotonic acid, maleic acid, monobutyl maleate, vinyl acetic acid and β-carboxyethyl acrylate.

The adhesive of the present invention may be a homopolymer of said (meth)acrylic acid. In particular, it is preferable to use a copolymer prepared by copolymerization of a monomer containing no carboxyl group and a carboxyl group-containing polymer at an appropriate copolymerization ratio, so that a desired property can be imparted to the adhesive, such as control of the acid number.

As the monomer containing no carboxyl group used herein, there may be mentioned a (meth)acrylic acid alkyl ester monomer as mentioned above, especially a (meth)acrylic acid alkyl ester monomer which contains an alkyl group having about 1 to 18 carbon atoms.

Besides the above-mentioned monomer, a monomer containing a different functional group may be used for the copolymerization to the extent that the properties of the acrylic adhesive are not diminished. Examples of the monomer containing a different functional group include a monomer containing a hydroxyl group, such as 2-hydroxyethyl(meth)acrylate, 2-hydroxypropyl(meth)acrylate and allyl alcohol; a monomer containing an amide group, such as (meth)acrylamide, N-methyl(meth)acrylamide and N-ethyl(meth)acrylamide; a monomer containing an amide group and a methylol group, such as N-methylol(meth)acrylamide and dimethylol (meth)acrylamide; a monomer containing a functional group like a monomer containing an amino group, such as aminomethyl(meth)acrylate, dimethylaminoethyl(meth)acrylate and vinylpyridine; and an epoxy-group containing monomer such as allyl glycidyl ether and (meth)acrylic acid glycidyl ether. Furthermore, there may be mentioned a vinyl group-containing aromatic compound such as styrene and methylstyrene, vinyl acetate and a halogenated vinyl compound, in addition to a fluorine-substituted (meth)acrylic acid alkyl ester and (meth)acrylonitrile.

In addition to the monomer as mentioned above which contains a functional group other than a carboxyl group, there may be used a monomer containing a different ethylene double bond as the monomer which will be the repeating unit of the acrylic adhesive used in the present invention. Examples of the monomer containing an ethylene double bond include an α,β-unsaturated dibasic acid diester such as dibutyl maleate, dioctyl maleate and dibutyl fumarate; a vinyl ester such as vinyl acetate and vinyl propionate; a vinyl ether; a vinyl aromatic compound such as styrene, α-methylstyrene and vinyl toluene; and (meth)acrylonitrile.

Also, a compound containing two or more ethylene double bonds may be used together with the monomer as mentioned above which contains an ethylene double bond. Examples of such a compound include divinylbenzene, diallyl malate, diallyl phthalate, ethylene glycol di(meth)acrylate, trimethylolpropane tri(meth)acrylate and methylene bis(meth)acrylamide.

Furthermore, in addition to the monomer as mentioned above, a monomer containing an alkoxyalkyl chain may be used, for example. Examples of an alkoxyalkyl(meth)acrylate ester include 2-methoxyethyl(meth)acrylate, methoxyethyl(meth)acrylate, 2-methoxypropyl(meth)acrylate, 3-methoxypropyl(meth)acrylate, 2-methoxybutyl(meth)acrylate, 4-methoxybutyl(meth)acrylate, 2-ethoxyethyl (meth)acrylate, 3-ethoxypropyl(meth)acrylate and 4-ethoxybutyl(meth)acrylate.

Commercially available acrylic-based adhesives under the trade names of: COPONYL 5705-L, 5407, N-2147 and 5698 (manufactured by: Nippon Synthetic Chemical Industry Co., Ltd.), the trade name of: Saivinol AT-361 (manufactured by: Saiden Chemical Industry Co., Ltd.), the trade name of: PE123 (manufactured by: Nippon Carbide Industries Co., Inc.), and the trade names of: SK-Dyne SK2094, SK1850G, SK2006, SK1888, SK1831 and SK1863 (manufactured by: Soken Chemical & Engineering Co., Ltd.) are suitably used from the viewpoint of reduction in haze and adhesion.

Dispersant

The dispersant adsorbs onto a pigment subject to dispersion and makes aggregated pigment particles wettable by a solvent or the like, which leads to a function of promoting shrinking pigment particles down to primary particles, preventing aggregation, decreasing viscosity, improving fluidity, preventing sedimentation, etc. In the present invention, when a pigment, which is composite tungsten oxide fine particle, is dispersed in an adhesive, a conventionally-known resin dispersant or inorganic dispersant may be appropriately used.

The resin dispersant has a pigment-affinity portion having a property of being adsorbed on a pigment, and a portion which is compatible with an adhesive or solvent. It adsorbs onto a pigment and serves to stabilize dispersion of the pigment in an adhesive or solvent. In addition, it functions to enhance the surface charge of pigment particles and increase the interparticle repulsion (excluded volume effect) caused by steric hindrance. Examples of the resin dispersion include polycarboxylate esters such as polyurethane and polyacrylate, unsaturated polyamide, polycarboxylic acid, polycarboxylic acid (partial) amine salt, polycarboxylic acid ammonium salt, polycarboxylic acid alkylamine salt, polysiloxane, long-chain polyaminoamide phosphate, hydroxyl group-containing polycarboxylate ester and modified products thereof, and amide and salts thereof, formed by reaction of poly(lower alkyleneimine) and polyester having a free carboxyl group. In addition, there may be used a (meth)acrylic acid-styrene copolymer, a (meth)acrylic acid-(meth)acrylate copolymer, a styrene-maleic acid copolymer; water-soluble resins and water-soluble polymeric compounds such as polyvinyl alcohol and polyvinyl pyrrolidone; polyesters, modified polyacrylates, and an ethylene oxide/propylene oxide addition compound, etc. These resin dispersions may be used solely or in combination of two or more kinds.

Examples of the inorganic dispersant include a phosphate compound such as sodium hexametaphosphate and sodium pyrophosphate, and a silicate compound such as sodium silicate and potassium silicate.

Surfactant

The surfactant serves to support these functions of the dispersant.

Examples of the surfactant includes anionic surfactants such as sodium lauryl sulfate, polyoxyethylene alkyl ether sulfate, sodium dodecylbenzene sulfonate, an alkaline salt of a styrene-acrylic acid copolymer, sodium stearate, sodium alkylnaphthalene sulfonate, sodium alkyl diphenyl ether disulfonate, monoethanolamine lauryl sulfate, triethanolamine lauryl sulfate, ammonium lauryl sulfate, monoethanolamine stearate, sodium stearate and monoethanolamine of a styrene-acrylic acid copolymer; nonionic surfactants such as polyoxyethylene oleyl ether, polyoxyethylene lauryl ether, polyoxyethylene nonylphenyl ether, polyoxyethylene sorbitan monostearate and polyethylene glycol monolaurate; cationic surfactants such as quaternary alkyl ammonium salt and ethylene oxide adduct thereof; amphoteric surfactants such as alkyl betaine, e.g., betaine alkyl dimethyl aminoacetate, and alkyl imidazoline; silicone-based surfactants; and fluorine-based surfactants. These surfactants may be used solely or in combination of two or more kinds.

In addition, examples of the surfactant include polyoxy ethylene alkyl ethers such as polyoxy ethylene stearyl ether; polyoxy ethylene alkyl phenyl ethers such as polyoxy ethylene octyl phenyl ether; polyethylene glycol diesters such as polyethylene glycol dilaurate and polyethylene glycol distearate; sorbitan fatty acid esters; fatty acid modified polyesters; and tertiary amine modified polyurethanes. These surfactants may be used solely or in combination of two or more kinds.

Zirconium Oxide Fine Particles

In the case of using composite tungsten oxide fine particles as a near-infrared absorbing agent, the reflected color tone tends to be bluish. When the reflected color tone is bluish, the contrast becomes insufficient; moreover, a display not in use has a bluish appearance, which is not favorable in terms of design, too.

The reason for the bluish reflected color tone is thought to be due to Rayleigh scattering resulted from that the composite tungsten oxide fine particles used as a near-infrared absorbing agent has a small particle diameter.

In contrast, from the viewpoint of eliminating the bluish color of reflected color tone, it is preferred that the near-infrared absorbing composition of the present invention comprise zirconium oxide fine particles having a small difference in refractive index with the composite tungsten oxide fine particles. For example, when $Cs_{0.33}WO_3$(cesium-containing tungsten oxide) is taken as an example of as the composite tungsten oxide fine particles, the refractive index is 2.5 to 2.6. On the other hand, the refractive index of zirconium oxide fine particles somewhat varies by impurities or their crystal structure, but is in the range from 2.0 to 2.2, and which makes it possible to set the difference in refractive index with the composite tungsten oxide fine particles to 0.3 or less.

The mechanism, which can reduce the bluish color arising from Rayleigh scattering by mixing the near-infrared absorbing composition prepared by dispersing composite tungsten oxide fine particles having an average particle diameter from 40 to 200 nm in the resin with zirconium oxide fine particles having a smaller average particle diameter than that of the composite tungsten oxide fine particles and a similar refractive index, still remains unclear but can be estimated as follows.

That is, the refractive index of the resin is normally around 1.5, while the refractive index of the composite tungsten oxide fine particles is around 2.0 to 2.5. Accordingly, the difference in refractive index of the surface of the composite tungsten oxide fine particles with the resin is as much high as around 0.5 to 1.0. Moreover, the refractive index changes discontinuously on the surface of the composite tungsten oxide fine particles. Therefore, the light reflectance of the surface of the composite tungsten oxide fine particles is increased, which is estimated to contribute to an increase in scattering intensity.

In the present invention, each of the composite tungsten oxide fine particles having a high refractive index and being highly light reflective is surrounded by the zirconium oxide fine particles like a halo, which have a similar refractive index to that of the composite tungsten oxide fine particles and a smaller particle diameter than that of the same (probably, the distribution density of the zirconium oxide fine particles is estimated to be higher as getting closer to the composite tungsten oxide fine particles). Therefore, in the vicinity of the surface of the composite tungsten oxide fine particles, the refractive index obtained by averaging the refractive index of the composite tungsten oxide fine particles, that of the zirconium oxide fine particles and that of a resin is allowed to decrease continuously outward from the fine particle of composite tungsten oxide (the difference between the refractive index of the composite tungsten oxide fine particles and that of a resin is alleviated.) Because of this reason, the light reflection of the surface of the composite tungsten oxide fine particles is decreased, which is estimated to contribute a decrease in scattering intensity.

From the viewpoint of preventing the reflected color of the near-infrared absorbing layer (near-infrared absorbing filter) from becoming bluish, it is necessary that the average particle diameter of the zirconium oxide fine particles is smaller than that of the composite tungsten oxide fine particles. In particular, the particle diameter of the composite tungsten oxide fine particles is from 40 to 200 nm, preferably from 40 to 60 nm. In view of the effect of Rayleigh scattering, the particle diameter of the zirconium oxide fine particles is particularly preferably in the range from 5 to 30 nm, still more preferably in the range from 10 to 20 nm. If the average particle diameter is less than 5 nm, it is not possible to eliminate the bluish reflected color tone. On the other hand, if the average particle diameter exceeds 30 nm, the effect of eliminating the bluish reflected color tone is decreased and, at the same time, white turbidity may occur.

A shape of the zirconium oxide fine particles is not particularly limited but is normally spherical.

The average particle diameter of the zirconium oxide fine particles is that measured by the method with the use of a transmission electron microscope, as well as the composite tungsten oxide fine particles.

A content of the zirconium oxide fine particles in the near-infrared absorbing composition is preferably from 50 to 200 parts by mass, with respect to the composite tungsten oxide fine particles of 100 parts by mass. It is possible to eliminate the bluish reflected color tone when the content is 50 parts by mass or more. On the other hand, no problem with white turbidity is caused when the content is 200 parts by mass or less.

Solvent

The solvent serves to mix and disperse the near-infrared absorbing composition uniformly, and imparts coatability to the composition.

Examples of the solvent include ketones (such as acetone, methyl ethyl ketone, methyl isobutyl ketone (MIBK), cyclohexanone and diacetone alcohol), ethers (such as dioxane and tetrahydrofuran), aliphatic hydrocarbons (such as hexane), alicyclic hydrocarbons (such as cyclohexane), aromatic hydrocarbon (such as toluene and xylene), halogenated carbons (such as dichloromethane and dichloroethane), esters (such as methyl formate, methyl acetate, ethyl acetate and butyl acetate), water, alcohols (such as ethanol, isopropanol, butanol and cyclohexanol), cellosolves (such as methyl cellosolve, ethyl cellosolve and butyl cellosolve), cellosolve acetates, sulfoxides (such as dimethylsulfoxide) and amides (such as dimethylformamide and dimethylacetamide). Also, a mixed solution thereof may be used.

Other Components

The near-infrared absorbing composition of the present invention may further contain one or more of a metal deactivator, a plasticizer, an antioxidant, a filler, a silane coupling agent, a crosslinking agent such as an isocyanate compound, and so on as long as the effects of the present invention are not deteriorated.

The metal deactivator used herein is one that forms a chelate with a heavy-metal ion and thus reduces redox potential of the heavy-metal ion.

As the metal deactivator, there may be mentioned a salicylic acid derivative, a hydrazide derivative, an oxamide derivative, a sulfur-containing phosphite, and so on. In particular, it is preferred to use a hydrazide derivative.

As the salicylic acid derivative, there may be mentioned ADK STAB CDA-1, ADK STAB CDA-6 and so on. In particular, it is preferred to use ADK STAB CDA-1. As the hydrazide derivative, for example, Irganox MD 1024 is preferably used.

As the oxamide derivative, Naugard XL-1 is preferably used. As the sulfur-containing phosphite, Hostanox OSP-1 is preferably used.

As the plasticizer, for example, there may be mentioned an oligo acrylate-based plasticizer. As the antioxidant, there may be mentioned a benzotriazole-based compound or the like. The benzotriazole-based compound is suitably used in an area which is in direct contact with the electroconductive mesh layer because the compound prevents the electroconductive mesh layer from oxidization and discoloration.

The near-infrared absorbing composition may further contain a component for regulating optical function, such as a neon light absorbing agent, a color correction dye, an ultraviolet absorbing agent and so on.

1. Neon Light Absorbing Agent

The neon light absorbing agent has a function of absorbing neon light emitted from a plasma display panel, that is, the emission spectrum of neon atoms. In the case where the neon light absorbing agent is contained, it is possible to prevent at least emission of orange light from a display, thereby obtaining a vivid red color. The emission spectrum range of neon light is in the wavelength range from 550 to 640 nm; therefore, when the neon light absorbing agent serves as the neon light absorbing layer, it is preferred to design the layer so as to have a spectral transmittance of 50% or less, more preferably 25% or less, at a wavelength of 590 nm. As the neon light absorbing agent, at least a dye which has its absorption maximum in a wavelength range from 550 to 640 nm, may be used. Specific examples of such a dye include a cyanine-based, oxonol-based, methine-based, subphthalocyanine-based or porphyrin-based dye. Among them, a porphyrin-based pigment is preferred. Among them, a tetraazaporphyrin-based dye as disclosed in Japanese Patent No. 3834479 is particularly preferred because it keeps excellent dispersibility in the pressure-sensitive adhesive layer and has excellent heat resistance, moisture resistance and light resistance.

A content of the neon light absorbing agent is not particularly limited, and is preferably from 0.05 to 5% by weight in the pressure-sensitive adhesive layer. If the content is 0.05% by weight or more, it is possible to obtain a sufficient neon light absorption function. If the content is 5% by weight or less, it is possible to transmit a sufficient amount of visible light.

2. Color Correction Dye

The color correction dye has a function of regulating the color of a filter for display to improve the color purity of light emitted from a panel, the range of color reproduction, or the color of a display when the display is turned off. Because the color correction function required for a display is different between displays, the color correction dye is appropriately adjusted to use.

As conventionally-known dyes which can be used as the color correction dye, those disclosed in JP-A Nos. 2000-275432, 2001-188121, 2001-350013 and 2002-131530 may be preferably used. In addition, pigments based on anthraquinone, naphthalene, azo, phthalocyanine, pyromethene, tetraazaporphyrin, squarylium, cyanine and so on may be used, which are capable of absorbing visible light such as yellow light, red light and blue light.

A content of the color correction dye may be appropriately regulated depending on the color to be compensated, and is not particularly limited. Normally, the color correction dye is contained in the pressure-sensitive adhesive layer in an amount of about 0.01 to 10% by weight.

3. Ultraviolet Absorbing Agent

As the ultraviolet absorbing agent, for example, a conventionally-known compound comprising an organic compound such as benzotriazole and benzophenone, or an inorganic compound such as particulate zinc oxide and cerium oxide, may be used.

Production Method of Near-Infrared Absorbing Composition

The near-infrared absorbing composition of the present invention may be produced by the following three steps.

(1) Preparation of Dispersion Liquid of Composite Tungsten Oxide Fine Particles

A dispersion liquid of the composite tungsten oxide fine particles of the present invention may be obtained by, for example, mixing composite tungsten oxide fine particles, which is an essential component, and a dispersant, which may be added if necessary, with an appropriate amount of solvent, and performing dispersion treatment on the mixture appropriately as needed.

(2) Preparation of Resin Varnish

Separately from the above dispersion liquid of composite tungsten oxide fine particles, the resin of the present invention is mixed with an appropriate amount of solvent to prepare a varnish.

(3) Preparation of Near-Infrared Absorbing Composition

The dispersion liquid of composite tungsten oxide fine particles is mixed with the resin-containing varnish. The mixture is stirred thoroughly, thereby obtaining the desired near-infrared absorbing composition.

In the near-infrared absorbing composition of the present invention, by setting the acid number of the resin to 0.6 or more and 30 or less, the composite tungsten oxide fine particles are allowed to have excellent dispersibility with respect to the resin, thereby preventing an increase in haze and imparting excellent transparency.

Properties of Near-Infrared Absorbing Composition

Solid concentration, viscosity, haze, etc., of the near-infrared absorbing composition prepared by the above method are preferably in the ranges below.

Solid Concentration

Solid concentration refers to the concentration of solid matters contained in the near-infrared absorbing composition, such as composite tungsten oxide fine particles and resin (adhesive). Considering coatability, film-forming ability and near-infrared absorbing property, the solid concentration is preferably from 5% by weight to 60% by weight.

Haze

It is preferred that the near-infrared absorbing composition of the present invention have a haze value of 5 or less when formed into a coating film of 25 μm in thickness and measured for a haze value in accordance with JIS K7136. The haze value is more preferably 3 or less, particularly preferably 2 or less.

Near-Infrared Absorbing Property

The near-infrared absorbing composition of the present invention preferably has a transmittance of near-infrared light in the wavelength range from 800 nm to 1,100 nm, that is, in the near-infrared region, of 20% or less, more preferably 15% or less.

Adhesion to Glass

It is preferred for the near-infrared absorbing composition of the present invention to have adhesiveness of such a degree that no spontaneous peeling and no slippage are generated so that semipermanent use is capable and a relatively easy peeling from a smooth surface is possible by purposefully peeling with an enough strong power which exceeds its weight even after attachment. It is also preferred for the near-infrared absorbing composition of the present invention that the glass adhesion of a film having a dried film thickness of 25 μm be from 0.5 to 30 N/25 mm. The glass adhesion can be measured by attachment to a sodium glass and peeling at 90° C. at a rate of 200 mm/min in accordance with the test of JIS Z0237-2000. The glass adhesion is more preferably from 1 to 20 N/25 mm, still more preferably from 5 to 15 N/25 mm.

Durability

It is desirable for the near-infrared absorbing composition of the present invention that the difference in values of glass adhesion before and after being left for 500 hours in an atmosphere of high temperature (for example, at a temperature of 80° C. and a relative humidity of 10% or less) or in an atmosphere of high temperature and high humidity (for example, at a temperature of 60° C. and a relative humidity of 90%) be 10 N/25 mm or less. The glass adhesion after being left for 500 hours is preferably 5 N/25 mm or more, more preferably 8 N/25 mm or more.

It is desirable for the near-infrared absorbing composition of the present invention that both differences Δx and Δy in chromaticity (x, y) before and after left in an atmosphere of high temperature be 0.03 or less, more preferably 0.02 or less. In addition, in the case of carrying out a heat and humidity resistance test in the same manner as described below, it is desirable that both differences Δx and Δy in chromaticity (x, y) before and after left in an atmosphere of high temperature and high humidity be 0.03 or less, more preferably 0.02 or less.

As the heat and humidity resistance test, firstly, a layer of the near-infrared absorbing composition of the present invention is formed on a glass (product name: PD-200, manufactured by Asahi Glass Co., Ltd.; thickness: 2.8 mm), followed by laminating a PET film (product name: A4100, manufactured by Toyobo Co., Ltd.; thickness: 50 μm) thereon, thereby preparing a sample for durability test. The sample for durability test is measured for chromaticity (x, y) before conducting the durability test. The chromaticity can be measured with the use of, for example, a spectral photometer (product name: UV-3100PC, manufactured by Shimadzu Corporation).

Secondly, the resulting sample for durability test is left for 1000 hours in an atmosphere of high temperature (for example, at a temperature of 80° C. and a relative humidity of 10% or less) or in an atmosphere of high temperature and high humidity (for example, at a temperature of 60° C. and a relative humidity of 90%), and measured for its chromaticity after the durability test was conducted, in the same manner as described above. Differences Δx and Δy in chromaticity (x, y) are calculated from the measured values of the chromaticity before and after left in the atmosphere of high temperature or in the atmosphere of high temperature and high humidity.

Near-Infrared Absorbing Filter

The near-infrared absorbing filter of the present invention is such that a transparent electroconductive layer is provided on one surface of a transparent substrate, and on the same or opposite surface thereof, a near-infrared absorbing layer (pressure-sensitive adhesive layer) comprising the near-infrared absorbing composition of the present invention is formed; a surface protective layer having one or more functions selected from the group consisting of an antireflection function, an antiglare function and an antiabrasion function is formed on the surface which is opposite to that of the transparent substrate on which the pressure-sensitive adhesive layer is formed; the pressure-sensitive adhesive layer contains a resin having a carboxyl group, in which resin the composite tungsten oxide fine particles are dispersed. The resin is preferably a pressure-sensitive adhesive, so that it is possible to obtain adhesion that makes it possible to adhere to the body or front panel of a display.

In the manner of use of the near-infrared absorbing filter of the present invention, a surface protective layer is preferably formed on an observer-side surface thereof.

In the near-infrared absorbing filter of the present invention, a section comprising the transparent substrate and transparent electroconductive layer will be also referred to as "electromagnetic wave shielding sheet."

Layer Structure of the Near-Infrared Absorbing Filter

A layer structure of the near-infrared absorbing filter of the present invention will be described with reference to the drawings.

Schematically shown in FIG. 1 is a cross-sectional view of an example of the near-infrared absorbing filter of the present invention. In the cross-sectional views shown in FIG. 1 and subsequent figures, the scale size of a width direction (the vertical direction of the figures) is far more enlarged than that of a planer direction (the horizontal direction of the figures) to simplify the explanation. A near-infrared absorbing filter 1A shown in FIG. 1 is a first embodiment of the preferred embodiments of the near-infrared absorbing filter of the present invention, wherein an electroconductive mesh layer 30 and a near-infrared absorbing layer (pressure-sensitive adhesive layer) 20 are formed on a PDP 50 side surface of a transparent substrate 10, and a surface protective layer 40 having one or more functions selected from the group consisting of an antireflection function, an antiglare function and an antiabrasion function is formed on an observer 60 side surface of the transparent substrate 10.

Figure 2:
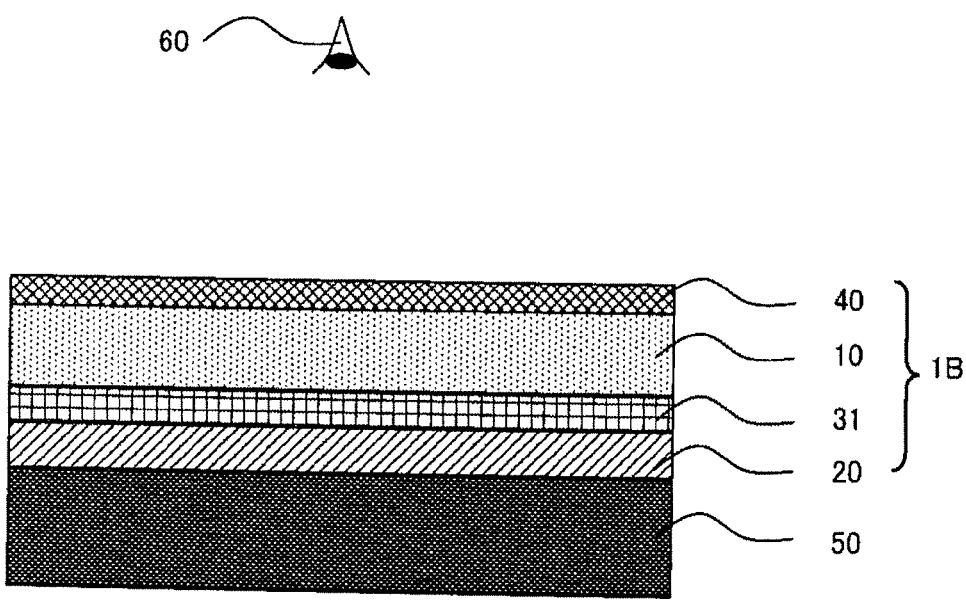
FIG. 2 is a sectional view schematically showing a different example of the near-infrared absorbing filter of the present invention.

FIG. 2 shows a near-infrared absorbing filter 1B, which is a second embodiment of the preferred embodiments of the near-infrared absorbing filter of the present invention, and wherein a transparent electroconductive layer 31 and a near-infrared absorbing layer (pressure-sensitive adhesive layer) 20 are laminated on a PDP 50 side surface of a transparent substrate 10, in this order from side closest to the transparent substrate 10; and a surface protective layer 40 having one or more functions selected from the group consisting of an antireflection function, an antiglare function and an antiabrasion function is formed on an observer 60 side surface of the transparent substrate 10.

Figure 3:
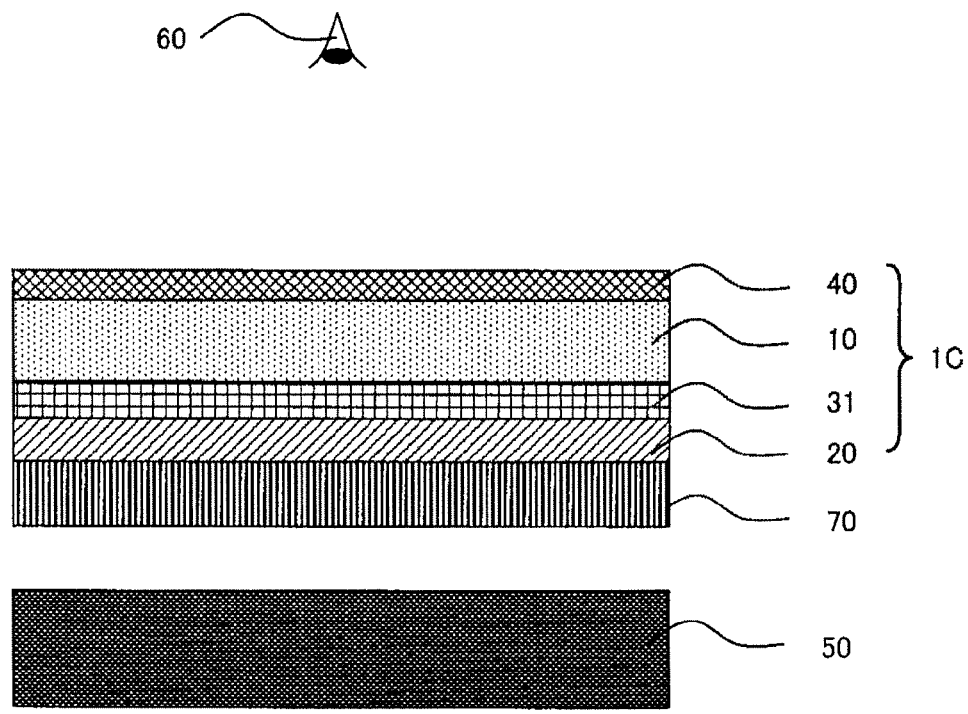
FIG. 3 is a sectional view schematically showing a different example of the near-infrared absorbing filter of the present invention.

FIG. 3 shows a near-infrared absorbing filter 1C, which is a third embodiment of the preferred embodiments of the near-infrared absorbing filter of the present invention, and wherein a transparent electroconductive layer 31 and a near-infrared absorbing layer (pressure-sensitive adhesive layer) 20 are laminated on a PDP 50 side surface of a transparent substrate 10, in this order from side closest to the transparent substrate 10; and a surface protective layer 40 having one or more functions selected from the group consisting of an antireflection function, an antiglare function and an antiabrasion function is formed on an observer 60 side surface of the transparent substrate 10, and the near-infrared absorbing filter 10 is attached to a front panel 70 via the pressure-sensitive adhesive layer 20.

The near-infrared absorbing filter of the present invention is designed to combine an electromagnetic wave shielding function, an antireflection function, an antiglare function and/or an antiabrasion function by using one transparent substrate and both surfaces thereof, in addition to a near-infrared absorption function. Accordingly, an optical function exhibiting section of the filter does not employ a conventional laminated structure in which each function exhibiting section has a transparent substrate and a plurality of transparent substrates (about two or three substrates) are thus contained in total. Therefore, the number of the transparent substrates and adhesive layers for laminating the transparent substrates, which substrates and layers were conventionally contained in an optical filter in numbers, can be reduced. In the result, the near-infrared absorbing filter of the present invention can decrease the cost of raw materials. Further, in the case of having the layer structure as that of the present invention, it is possible to prevent interface reflection by decreasing the number of layers.

The composite tungsten oxide fine particles used in the present invention as a near-infrared absorbing agent have high heat resistance, high moisture resistance and high light resistance. Especially, even if the fine particles are contained in a layer which is in contact with an electroconductive metal mesh layer, glass substrate of the front panel of a display, or adhesive layer having urethane bonds, the composite tungsten oxide fine particles resist to deterioration of characteristics caused by reaction with these layers which can trigger deterioration of conventional organic near-infrared absorbing dyes. In addition, the composite tungsten oxide fine particles can absorb the entire region of the near-infrared light of wavelength 800 to 1,100 nm which is generated from the front surface of a display only by the particles themselves, so that it is not necessary to use an organic near-infrared absorbing agent together with the particles, which are more likely to deteriorate. Accordingly, the near-infrared absorbing filter of the present invention can resist to color non-uniformity attributed to deterioration of a near-infrared absorbing agent even after a long-term use, especially even after a long-term use at high temperature or high humidity. In addition, it is not necessary to keep the near-infrared adsorbing layer away from, for example, a glass substrate such as the surface of a display or an adhesive layer between the substrates of an optical layer to prevent the near-infrared absorbing agent from deterioration. Therefore, it is now possible to realize a structure as that of the near-infrared absorbing filter of the present invention, which can provide excellent production efficiency by reducing the number of lamination steps and can decrease the cost of raw materials with the limited number of laminated layers, while having no color non-uniformity, having excellent appearance, and having functions of a near-infrared absorption function and a surface protection function.

When composite tungsten oxide fine particles are contained in a layer which is provided as a relatively thin layer such as antireflection layer, a problem arises that the density of the fine particles in the layer is increased, which leads to an increase in haze. However, when tungsten oxide fine particles are contained in a pressure-sensitive adhesive layer as in the present invention, it is advantageous that an increase in haze can be prevented because the pressure-sensitive adhesive layer is thicker than the antireflection layer.

Hereinafter, the transparent substrate, near-infrared absorbing layer (pressure-sensitive adhesive layer), transparent electroconductive layer and surface protective layer of the near-infrared absorbing filter of the present invention will be described in this order.

Transparent Substrate

The transparent substrate is a layer constituting a part of the near-infrared absorbing filter and a layer which can be imparted with an ultraviolet absorption function, if required. Hence, the transparent substrate film may be selected according to the purpose in consideration of performances such as heat resistance and so on accordingly if the substrate has an ultraviolet absorption function as well as mechanical strength and light transparency. A specific example of such a transparent substrate is a sheet (or film; hereinafter the same meaning shall apply) comprising an organic material such as resin or a plate comprising an organic material such as resin or an inorganic material such as glass. Higher transparency is better for the transparent substrate. In particular, preferred light transparency is a light transmittance of 70% or more in the visible light range from 380 to 780 nm, more preferably 80% or more. The light transparency can be measured with the use of a spectral photometer (product name: UV-3100PC, manufactured by Shimadzu Corporation) for example, and values measured at room temperature and in the air can be used.

Examples of transparent resins used for materials for the transparent substrate include polyester resins such as polyethylene terephthalate, polybutylene terephthalate, polyethylene naphthalate, a terephthalic acid-isophthalic acid-ethylene glycol copolymer, and a terephthalic acid-cyclohexanedimethanol-ethylene glycol copolymer; polyamide resins such as Nylon 6; polyolefin resins such as polypropylene, polymethylpentene and a cycloolefin polymer; acrylic resins such as polymethylmethacrylate; styrene resins such as polystyrene, a styrene-acrylonitrile copolymer; cellulose resins such as triacetyl cellulose; imide resins; and polycarbonate resins.

Organic materials used for the transparent substrate include, for example, soda glass, potassium glass, lead glass, glasses such as borosilicate glass, ceramics such as PLZT, quartz and fluorite.

These resins are used solely or in combination as a mixed resin (including a polymer alloy). A single layer or a laminate composed of two or more layers is used as the layer structure of the transparent substrate. In the case of the resin film, a uniaxially oriented film or a biaxially oriented film is preferably used from the viewpoint of mechanical strength. These resins may be mixed with an additive such as an ultraviolet absorbing agent, a filler, a plasticizer and an antistatic agent, as needed.

Basically, a thickness of the transparent substrate may be determined according to the intended application, and is not particularly limited. The thickness is generally from 12 to 5000 μm. In the case of the sheet, the thickness is preferably from 50 to 300 μm, more preferably from 50 to 200 μm. When having a thickness in the range, the transparent substrate has sufficient mechanical strength so that warpage, loosening, breaking or the like can be prevented and the transparent substrate can be easily supplied and processed in the form of a continuous belt-shaped. In the case of the plate, the thickness is preferably from 500 to 3000 μm.

The transparent substrate in the present invention includes, besides the resin sheet (including the resin film), those that are called resin plates. However, the transparent substrate is preferably thin from the viewpoint of avoiding an increase in total layer thickness caused by laminating each filter film of NIR absorption, Ne light-absorption, and color correcting so as to decrease the thickness of the near-infrared absorbing filter.

For the above-mentioned reasons, as the form of the transparent substrate, a transparent resin film is preferable to a resin plate. Among the resin films, a film of polyester resin such as polyethylene terephthalate and polyethylene naphthalate is particularly preferred in terms of transparency, heat resistance, costs and so on. More preferred is a biaxially oriented polyethylene terephthalate film.

In the present invention, when the transparent substrate has a ultraviolet absorption function, the structure is such that an ultraviolet absorbing agent is mixed with the resin of the transparent substrate film; a surface coating layer containing an ultraviolet absorbing agent is provided on the surface as one of the layers constituting the transparent substrate; or both of the means are used in combination. The surface to which the surface coating layer is provided may be either one side or both sides of the transparent substrate.

In consideration of providing the surface protective layer on one side of the transparent substrate, if the surface coating layer containing an ultraviolet absorbing agent is formed on the side to which the surface protective layer is provided, the surface coating layer may also be used as the surface protective layer.

Near-Infrared Absorbing Layer Pressure-Sensitive Adhesive Layer

The near-infrared absorbing layer (especially in the case where the resin is in the form of a pressure-sensitive adhesive, it will be referred to as pressure-sensitive adhesive layer) is formed by using the near-infrared absorbing composition of the present invention. It has a near-infrared absorption function and is imparted with transparency required for an optical filter.

Transparent Electroconductive Layer

The transparent electroconductive layer refers to a layer which has light transparency that allows watching an image displayed on a PDP through the transparent electroconductive layer and has electroconductivity that can shield electromagnetic waves emitted from a PDP. As the transparent electroconductive layer, there may used a thin, non-patterned (solid) layer formed by using a transparent electroconductive material such as indium-tin oxide (ITO), or an electroconductive mesh layer formed into a pattern of fine mesh by using an opaque, electroconductive material such as metal material like copper, copper alloy, aluminum, etc. In the present invention, no particular limitation is imposed on the material and method for forming the transparent electroconductive layer, and a conventionally-known transparent electroconductive layer may be appropriately used.

1. Electroconductive Mesh Layer

The electroconductive mesh layer is a layer which has conductivity and thus has an electromagnetic wave shielding function. The layer itself is opaque but is in the form of a mesh and has a large number of openings, thereby satisfying both electromagnetic wave shielding function and light transparency. Also, in the typical embodiment of the present invention, the electroconductive mesh layer contains a copper plating layer and a blackened layer as major layers. In some cases, it may additionally contain a copper sputtering layer, or a second blackened layer, conventionally-known blackened layer or anticorrosive layer may be formed on the copper plating layer. The electromagnetic wave shielding sheet in use is disposed so that the side on which a blackened layer is provided of the sheet faces an observer, in order to exhibit the function of absorbing outside light of the blackened layer.

2. Method of Forming Electroconductive Mesh Layer

In the present invention, no particular limitation is imposed on the material and method for forming the electroconductive mesh layer having a mesh area and an earthing area, and conventionally-known materials and methods for forming an electromagnetic wave shielding sheet can be appropriately employed.

The methods of forming the electroconductive mesh layer having the mesh area includes, but is not limited to, the following methods (1) to (4):

(1) A method wherein an electroconductive ink is printed in pattern on a transparent substrate. As the electroconductive ink, a composition prepared by dispersing electroconductive particles of silver, black lead or the like in a resin binder such as acrylic resin and polyester resin, is used. As the printing method, methods such as silk screen, intaglio printing and flexo printing may be used. If sufficient electrical conductivity cannot be provided by the electroconductive ink alone, there is a method of providing a metal layer of copper, silver or the like on the electroconductive ink layer by plating (see JP-A No. 2000-13088, for example).

(2) A method wherein an electroconductive ink or a photosensitive coating liquid containing a chemical plating catalyst is applied on the whole surface of a transparent substrate to prepare a coating layer, and the resulting coating layer is processed to be in a mesh form by photolithographic method, followed by copper plating on the mesh (for example, Advanced Materials Research Group New Technology Research Laboratory of SUMITOMO OSAKA CEMENT Co., Ltd., "Photosensitive Catalyst for Electro-less Plating with Fine Pattern", [online], no date of posting, SUMITOMO OSAKA CEMENT Co., Ltd., [searched on Jan. 7, 2003], Internet <URL:http://www.socnb.com/product/hproduct/display.html>);

(3) A method wherein a metallic thin film is formed on one surface of a transparent substrate by sputtering or the like to form an electroconductively treated layer or the like; a copper plating layer is formed on the transparent substrate by electrolytic plating; a second blackened layer or a different conventionally-known blackened layer is additionally formed thereon to prepare a transparent substrate on which all the layers constituting an electroconductive layer are completely formed; and the electroconductive layer on the transparent substrate is formed in a mesh form by a photolithographic method (see Japanese Patent No. 3502979 and JP-A No. 2004-241761, for example).

(4) A method wherein a metallic foil is attached to one surface of a transparent substrate by a dry lamination method to prepare an electroconductive layer, followed by processing the electroconductive layer on the transparent substrate in a mesh form by a photolithographic method (see Japanese Patent No. 3388682, for example).

Surface Protective Layer

The surface protective layer used in the present invention is a layer to protect the surface of the transparent substrate, and has one or more functions selected from the group consisting of an antireflection function, an antiglare function and an antiabrasion function. The surface protective layer may be formed as a single layer or multiple layers. However, no substrate is disposed between two or more layers constituting the surface protective layer of the present invention. It is preferred to impart the function of antireflection, antiglare to the topmost layer of the near-infrared absorbing filter of the present invention as a means to decrease the reflection of background resulted from specular reflection of light from the outside on the surface of an image display device, image whitening and deterioration of image contrast. Hence, it is preferred to form a so-called antiglare layer and/or so-called antireflection layer. The former antiglare layer employs a method in which the antiglare layer acts like frosted glass to scatter or diffuse a light thereby blurring away a background image caused by light from the outside. The latter antireflection layer is a so-called narrowly-defined antireflection layer, which employs a method to obtain an excellent antireflection effect by alternately laminating a high refractive index material and a low refractive index material, multi-coating so that the outermost surface is a low refractive index layer, allowing lights reflected on layer interfaces to be offset by interference, and thereby suppressing reflection on the surface.

To impart an UV shielding function to the near-infrared absorbing filter, the surface protective layer may contain an ultraviolet absorbing agent.

1. Antiglare Layer

The antiglare layer (abbreviated as AG layer) basically serves to roughen a light incident surface so that light from the outside is scattered or diffused. To roughen the light incident surface, there may be a method of roughening a surface of a substrate by forming fine convexoconcaves directly thereon by a sandblast method, an emboss method or the like; a method of providing a roughened layer on a surface of a substrate by forming a film in which, as light diffusion particles, an inorganic filler such as silica or an organic filler such as resin particles is contained in a resin binder that is curable with radiation, heat or combination thereof; a method of forming a porous film of sea-island structure on a surface of a substrate; and so on. As the resin of the resin binder, a curable acrylate resin, an ionizing radiation-curable resin (as with the antiabrasion (hard coat) layer which will be described below) or the like is suitably used because the antiglare layer is a surface layer and required to have surface strength.

A thickness of the antiglare layer is not particularly limited and is preferably from 0.07 μm or more and 20 μm or less.

2. Antireflection Layer

The antireflection layer (abbreviated as AR layer) is generally a single layer of low refractive-index layer or has a multilayer structure in which low refractive index layers and high-refractive index layers are alternately laminated so that the a low refractive-index layer comes to the top as the topmost layer. It may be formed by a dry film-forming method such as deposition and sputtering, or by a wet film-forming method such as coating. Silicon oxide, magnesium fluoride, cryolite, silicon-containing resin or the like is used for the low refractive index layer, and titanium oxide, zinc sulfide, zirconium oxide, niobium oxide or the like is used for the high-refractive index layer. The "high-refractive (low-refractive) index layer" as used herein means that the layer has a relatively higher (lower) refractive index compared to an adjacent layer (for example, a transparent substrate or a low-refractive (high-refractive) index layer).

To impart an antiabrasion function to the antireflection layer further, the antireflection layer is formed by appropriately using a high hardness material as with the antiabrasion (hard coat) layer that will be described below.

To improve the effect of antireflection, from the viewpoint of optical theory, the refractive index of the low refractive index layer is ideally set to the square root of the refractive index of the layer which is just below the low refractive index layer (the high refractive index layer or transparent substrate). If it is not possible to exactly fulfill the theoretical value, it is necessary to design so as to bring the refractive index close to the theoretical value as much as possible. For example, even in the case of the high refractive index layer, the refractive index is normally about 2.1 at the most. Thus, it is normally preferred that the refractive index of the low refractive index layer is 1.45 or less. Materials having these characteristics include, for example, a low-reflection inorganic material in which an inorganic material such as LiF (refractive index n=1.36), $MgF_2$ (refractive index n=1.38), $3NaF.AlF_3$ (refractive index n=1.4), $AlF_3$ (refractive index n=1.37), $Na_3AlF_6$ (refractive index n=1.33), $SiO_2$ (refractive index n=1.45), NaF (refractive index n=1.33), $CaF_2$ (refractive index n=1.44) or the like is microparticulated and contained in an acrylic resin, an epoxy resin or the like, and a low-reflection organic material such as a fluorine- and silicone-based organic compound, a thermoplastic resin, a thermosetting resin, a radiation curing resin or the like.

Also, void-containing fine particles may be used for the low refractive index layer. The void-containing fine particles refers to fine particles which form a structure that air is filled inside the particles and/or air-containing porous structure, and which have a refractive index that lowers inversely with the air occupancy in the fine particles, compared with the inherent refractive index of the fine particles. In the present invention, the void-containing fine particles also include fine particles capable of forming a nanoporous structure in at least a part of the inside and/or the surface of the layer, depending on the form, structure, aggregated state of the fine particles, or the dispersed state of the fine particles in the coating film. The void-containing particles may be inorganic or organic particles such as particles of metal, metal oxide, resin, and is preferably silicon oxide (silica).

Furthermore, a material prepared by mixing a sol with a fluorine-based film forming agent may be used, in which the sol comprises superfine silica particles of from 5 to 30 nm dispersed in water or organic solution. As the sol, there may be used a conventionally-known silica sol obtained by condensing active silica which is known to be produced by, for example, a method of dealkalizing an alkali metal ion in silicate alkali salt by ion exchange or the like, or by a method of neutralizing silicate alkali salt with mineral acid; a conventionally-known silica sol obtained by hydrolyzing and condensing alkoxysilane in an organic solvent in the presence of a basic catalyst; and an organic solvent-based silica sol (organosilicasol) obtained by replacing water in said water-based silica sol with organic solvent by a distillation method, or the like. These silica sols may be either water-based or organic solvent-based. In the production of organic solvent-based silica sol, it is not necessary to completely replace water with organic solvent. The silica sol contains a solid content of 0.5 to 50% by mass as $SiO_2$. The superfine silica particles in the silica sol can have any structure such as sphere structure, needle structure or plate structure. As the film-forming agent, there may be used alkoxysilane, metallic alkoxide, hydrolysate of metallic salt and fluorine-modified polysiloxane, for example. According to the preferred embodiment of the low refractive index layer, it is preferred to use "void-containing particles".

The low refractive index layer may be obtained as follows. The above-mentioned materials are diluted in a solvent for example and provided on the high refractive index layer by a wet coating method such as spin coating, roll coating or printing, or by a vapor phase method such as vacuum deposition, sputtering, plasma CVD or ion plating, followed by drying and then curing with heat, radiation (in the case of ultraviolet radiation, a conventionally-known photopolymerization initiator is used) or the like, thereby obtaining the low refractive index layer.

The formation of the high refractive index layer may be performed by using a high refractive index binder resin to obtain a high refractive index, by adding superfine particles having a high refractive index to a binder resin, or by using both of the methods. The refractive index of the high refractive index is preferably in the range from 1.55 to 2.70.

As the resin used to produce the high refractive index layer, any resin may be used as long as it is transparent, and there may be used a thermosetting resin, a thermoplastic resin, a radiation (including ultraviolet) curable resin and so on. As the thermosetting resin, there may be used a phenol resin, a melamine resin, a polyurethane resin, an urea resin, a diarylphthalate resin, a guanamine resin, an unsaturated polyester resin, an aminoalkyd resin, a melamine-urea cocondensation resin, a silicon resin, a polysiloxane resin and so on. If required, a curing agent such as a crosslinking agent or a polymerization initiator, a polymerization accelerator, a solvent and/or a viscosity modifier may be added to the resin.

Examples of the superfine particles having a high refractive index include fine particles such as ZnO (refractive index n=1.9), $TiO_2$ (refractive index n=2.3 to 2.7) and $CeO_2$ (refractive index n=1.95), which are also able to provide the effect of ultraviolet shielding, and fine particles such as antimony-doped $SnO_2$ (refractive index n=1.95) and ITO (refractive index n=1.95), which are imparted with an antistatic effect and thus able to prevent attachment of dust. Other fine particles include $Al_2O_3$ (refractive index n=1.63), $La_2O_3$ (refractive index n=1.95), $ZrO_2$ (refractive index n=2.05) and $Y_2O_3$ (refractive index n=1.87). These fine particles may be used alone or in a mixture. From the viewpoint of dispersibility, colloidal dispersions of these particles dispersed in an organic solvent or water are excellent. A particle diameter of the particles is from 1 to 100 nm, preferably from 5 to 20 nm from the viewpoint of transparency of the film.

The high refractive index layer may be obtained as follows. The above-mentioned materials are diluted in a solvent for example and provided on a substrate by a method such as spin coating, roll coating or printing, followed by drying and then curing with heat, radiation (in the case of ultraviolet radiation, a conventionally-known photopolymerization initiator is used) or the like, thereby obtaining the high refractive index layer. A thickness of the antireflection layer is not particularly limited. In general, the product of the thickness and refractive index of the low refractive index layer is about one-fourth (95 to 195 nm) of a wavelength in the visible light range (380 nm to 780 nm) that must be prevented from being reflected.

3. Antiabrasion Layer

The antiabrasion (hard coat) layer preferably shows a hardness of "H" or more in the pencil hardness test defined in JIS K5600-5-4 (1999). No particular limitation is imposed on material usable for the layer as long as the material can provide such a hardness and the same transparency as that of the transparent substrate.

The antiabrasion (hard coat) layer is normally formed as a cured resin layer. An ionizing radiation-curable resin, a conventionally-known curable resin or the like may be appropriately selected as the curable resin which is used for the layer, depending on the required performance. Examples of the ionizing radiation-curable resin include resins based on acrylate, oxetane, silicone and the like. For example, the acrylate-based ionizing radiation-curable resin may be formed as a coating film containing a polyfunctional (meth)acrylate prepolymer such as polyester(meth)acrylate, urethane(meth)acrylate or epoxy(meth)acrylate solely, or containing a tri- or more polyfunctional (meth)acrylate monomer such as trimethylolpropane tri(meth)acrylate, pentaerythritol tetra(meth)acrylate and dipentaerythritol hexa(meth)acrylate solely, or containing two or more of the above. The term "meth(acrylate)" used herein is a composite term which refers to acrylate or methacrylate. The antiabrasion (hard coat) layer may be formed by applying the above material, which may be diluted in a solvent as needed, onto the transparent substrate by a wet film-forming method such as coating.

A thickness of the antiabrasion layer is not particularly limited, and is preferably 1.0 µm or more and 20 µm or less, more preferably 3.0 µm or more and 5 µm or less.

4. Ultraviolet Absorbing Layer

In the present invention, in order to prevent deterioration of the light absorbing agent contained in the near-infrared absorbing layer (pressure-sensitive adhesive layer) of the present invention, an ultraviolet absorbing agent may be added to the pressure-sensitive adhesive layer so that the pressure-sensitive adhesive layer also serves as the ultraviolet absorbing layer, or the ultraviolet absorbing layer may be a layer (including a substrate) which is independent of the pressure-sensitive adhesive layer and positioned closer to an observer than the pressure-sensitive adhesive layer. In addition to the above embodiment in which an ultraviolet absorption function is imparted to the transparent substrate of the electromagnetic wave shielding sheet, the ultraviolet absorbing layer may be provided as the surface protective layer. The ultraviolet absorbing layer may be a layer in which an ultraviolet absorbing agent is added to the surface protective layer having other functions so that the resulting layer is imparted with other functions and an ultraviolet absorption function. Alternatively, it may be an ultraviolet absorbing independent layer. As the ultraviolet absorbing agent used for the functional layer, ultraviolet absorbing agents which are the same as those described in connection with the near-infrared absorbing composition of the present invention, may be used. As a binder resin which is used for preparing the ultraviolet absorbing layer as an independent layer, a resin such as polyester resin, polyurethane resin, acrylic resin and epoxy resin is used.

Also, a commercial ultraviolet cut filter such as "sharp cut filter SC-38", "sharp cut filter SC-39", "sharp cut filter SC-40" (product names, manufactured by FUJIFILM Corporation) and "Acryplen" (product name, manufactured by MITSUBISHI RAYON Co., Ltd.) may be used.

A thickness of the ultraviolet absorbing layer is not particularly limited, and is preferably 1.0 µm or more and 30 µm or less, more preferably 10 µm or more and 20 µm or less.

5. Other Layers

Other layers include, for example, a neon light absorbing layer, a color correction layer and so on. From the viewpoint of production efficiency, rather than preparing the neon light absorbing layer or color correction layer as an independent layer, it is preferred to add a neon light absorbing agent or color correction dye to the near-infrared absorbing layer (pressure-sensitive adhesive layer) or a different layer so that the resulting layer also serves as the neon light absorbing layer or color correction layer. Even in the case of preparing these layers as an independent layer, as the neon light absorbing agent and color correction dye used for the preparation, neon light absorbing agents and color correction dyes which are the same as those described in connection with the near-infrared absorbing composition of the present invention, may be used.

6. Other Functions

A silicone compound, a fluorine compound or the like may be added to the surface protective layer from the viewpoint of improving contamination resistance. Besides, an antistatic agent, an antibacterial agent or the like may be added thereto.

The surface protective layer may be a layer that is formed as an antifouling layer to prevent attachment of dust or contaminants to the surface of the near-infrared absorbing filter in use, which is caused by environmental pollution or careless contact with the surface, or to make it easy to remove such dust or contaminants if attached. For example, a fluorine-based coating resin, a silicone-based coating agent, a silicone-fluorine-based coating agent or the like may be used. In particular, a silicone-fluorine-based coating agent is preferably used. A thickness of the antifouling layer is preferably 100 nm or less, more preferably 10 nm or less, still more preferably 5 nm or less. If the thickness of the antifouling layer is more than 100 nm, the layer is excellent in initial contamination resistance but is inferior in durability. The thickness of the antifouling layer is most preferably 5 nm or less from the viewpoint of a balance between contamination resistance and durability.

The surface protective layer used in the present invention is preferably formed as a single layer with multiple functions.

For example, in addition to the antiabrasion function, the surface protective layer may further have a function of preventing specular reflection of light from the outside. A specific embodiment is such that the antiabrasion layer is also used as an antiglare layer or antireflection layer. For example, in the case of using the antiabrasion layer as an antiglare layer, there may be an embodiment in which light diffusive particles are contained in the antiabrasion layer that is the topmost layer of the surface protective layer, and an embodiment in which a surface of the antiabrasion layer is roughened.

To roughen the surface by molding, after or when applying a resin composition for forming the antiabrasion layer on the surface of the transparent substrate or on the surface of the electroconductive mesh layer of the electromagnetic wave shielding sheet, or in the case of curing the resin, while the resin has fluidity capable of molding and before the resin is completely cured, the surface may be molded using a molding sheet or molding plate.

In the case of using the antiabrasion layer as the antireflection layer, the antiabrasion layer, which is the topmost layer of the surface protective layer, may have a refractive index which is lower than that of the layer disposed just below the antiabrasion layer by the method as mentioned in the description in connection with the antireflection layer.

7. Formation of Surface Protective Layer

The formation of the surface protective layer may be conducted in the same manner as that of the pressure-sensitive adhesive layer that will be described below. For example, in the case of forming the surface protective layer on the electroconductive mesh layer of the electromagnetic wave shielding sheet, it is preferred to conduct intermittent coating or intermittent lamination in the condition that will be described hereinafter.

Production Method of Near-Infrared Absorbing Filter

The production method of the near-infrared absorbing filter may not be particularly limited. Preferably, a continuous belt-shaped transparent substrate film is taken and conveyed continuously or intermittently so as to form necessary layers continuously or intermittently. That is, it is preferable to produce the near-infrared absorbing filter by so-called roll-to-roll processing from the viewpoint of productivity, etc. In that case, it is more preferable to complete the lamination of all layers continuously by one single machine.

Also, the order of forming these layers is not particularly limited and may be determined in accordance with specifications. For example, the order will be explained as below using the structure of the near-infrared absorbing filter shown in FIG. 1 as an example.

At first, a transparent substrate is provided, and the procedures are the followings, for example:

(A) (1) formation of a surface protective layer; (2) formation of an electroconductive layer on the surface which is opposite to that of the transparent substrate on which the surface protective layer is formed, followed by formation of an electroconductive mesh layer by etching the electroconductive layer; and (3) formation of a near-infrared absorbing layer (pressure-sensitive adhesive layer) on the electroconductive mesh layer-side surface of the transparent substrate;

(B) (1) formation of an electroconductive layer, followed by formation of an electroconductive mesh layer by etching the electroconductive layer; (2) formation of a surface protective layer on the surface which is opposite to that of the transparent substrate on which the electroconductive mesh layer is formed; and (3) formation of a near-infrared absorbing layer (pressure-sensitive adhesive layer) on the electroconductive mesh layer-side surface of the transparent substrate; or (C) (1) formation of an electroconductive layer; (2) formation of a surface protective layer on the surface which is opposite to that of the transparent substrate on which the electroconductive layer is formed; (3) formation of an electroconductive mesh layer by etching the electroconductive layer; and (4) formation of a near-infrared absorbing layer (pressure-sensitive adhesive layer) on the electroconductive mesh layer-side surface of the transparent substrate.

The pressure-sensitive adhesive layer may be formed by a wet film-forming method in which, for example, a coating liquid for forming a pressure-sensitive adhesive layer comprising at least the above-specified tungsten oxide fine particles and resin, is applied on the electroconductive mesh layer in the first embodiment (see FIG. 1) or on the transparent electroconductive layer in the second embodiment (see FIG. 2).

The pressure-sensitive adhesive layer may be formed by applying the coating liquid for forming a pressure-sensitive adhesive layer on a release sheet, such as a PET film subjected to release treatment, and drying the same. In this case, it is preferred that the pressure-sensitive adhesive layer formed on the release sheet be protected from above with the use of a similar release sheet until the layer is attached to the electromagnetic wave shielding sheet.

Alternatively, the pressure-sensitive adhesive layer may be formed by extrusion molding of a resin composition in which the above-specified tungsten oxide fine particles are uniformly dispersed. Even in this case, it is preferred that the both sides of the pressure-sensitive adhesive layer be protected with the release sheets.

Especially in the case of providing the pressure-sensitive adhesive layer on the electroconductive mesh layer of the electromagnetic wave shielding sheet so that convexoconcaves of the electroconductive mesh layer are planarized and a part of a periphery of the electroconductive mesh layer is exposed, the pressure-sensitive adhesive layer is formed by intermittent coating or intermittent lamination. The pressure-sensitive adhesive layer is not formed all over the electroconductive mesh layer but is formed into a pattern to expose a part of the periphery of the electroconductive mesh layer.

From the viewpoint of increasing the transparency of the near-infrared absorbing filter, it is preferred that the near-infrared absorbing layer (pressure-sensitive adhesive layer) 20 shown in FIG. 1 is provided by coating or lamination so that the convexoconcaves of the electroconductive mesh layer are completely filled to prevent air from entering the convexoconcaves and the surface of the pressure-sensitive adhesive layer is planarized. The part to be exposed of the periphery of the electroconductive mesh layer is only necessary to be a part which is, as mentioned above, used as an earthing area. In particular, it is preferred the pressure-sensitive adhesive layer is provided so that all the four sides of the periphery of the electroconductive mesh layer are exposed.

Intermittent Coating

To apply the coating liquid for forming a pressure-sensitive adhesive layer so that the convexoconcaves of the electroconductive mesh layer are completely filled to prevent air from entering the convexoconcaves and the surface of the pressure-sensitive adhesive layer is planarized, it is preferred that the coating liquid have fluidity when applied on the electroconductive mesh layer. In this case, the pressure-sensitive adhesive layer reaches and fills in every corner of the openings of the mesh when laminated to the electroconductive mesh layer, thereby preventing bubbles from remaining in the openings. Therefore, it is possible to avoid a problem of increased haze of the near-infrared absorbing filter, which is attributed to light scattered by the bubbles, with omitting the step of planarizing the mesh surface, thereby obtaining a highly-transparent near-infrared absorbing filter with excellent production efficiency. Accordingly, the fluidity of the pressure-sensitive adhesive layer of the present invention is designed to be so fluent that the pressure-sensitive adhesive layer can enter the openings of the mesh area, replace the air in the openings with the layer itself, and fill the openings. The fluidity of the pressure-sensitive adhesive layer of the present invention refers to a property of having no or very little restoring force against an external force and of being capable of transforming or undergoing displacement virtually and indefinitely. Such a fluidity includes Newtonian viscosity like water, non-Newtonian viscosity like dilatancy or thixotropic, or creep deformation property, for example. The pressure-sensitive adhesive layer is preferably used to have a viscosity of, as a guideline, 1000 cps or less, preferably 5000 cps or less, when applied on the mesh surface (a value measured by means of a C-type viscometer at the adhesion temperature). However, it is preferred to decrease the fluidity of the pressure-sensitive adhesive layer as needed after the pressure-sensitive adhesive layer is laminated onto the mesh openings of the electromagnetic wave shielding sheet. That is, the higher fluidity of the pressure-sensitive adhesive layer the better when the pressure-sensitive adhesive layer is laminated to the electroconductive mesh layer, so that the mesh openings are filled completely. After lamination, however, the fluidity of the pressure-sensitive adhesive layer is no longer necessary and preferred because the fluidity of the pressure-sensitive adhesive may cause the adhesive to leak from an interface of the laminated layers or may promote the discoloration of a light absorbing agent or dye.

To impart fluidity to the coating liquid for forming a pressure-sensitive adhesive layer, the materials for the pressure-sensitive adhesive layer may be diluted in a solvent, or there may be used natural rubber or synthetic resin, each of which contains no solvent and is fluid at room temperature. Alternatively, there may be used a pressure-sensitive adhesive material comprising a syrupy pressure-sensitive adhesive in which a reactive monomer dissolves a polymer thereof. Further, there may be used a hot melt pressure-sensitive adhesive which is fused by appropriately heating and thus is imparted with fluidity. Furthermore, the pressure-sensitive adhesive layer may be a pressure-sensitive adhesive layer which contains a polymerization-reactive monomer that is liquid at room temperature, and which is designed to be cured with light and/or heat after lamination. The method of decreasing the fluidity of the pressure-sensitive adhesive layer as needed after the layer is attached or laminated may be, for example, a method of drying a diluting solvent or a method in which a crosslinking agent is added to the pressure-sensitive adhesive layer in advance, and then the pressure-sensitive adhesive is subjected to crosslinking or polymerization by heating, ultraviolet irradiation, etc.

Examples of the method of conducting intermittent coating include a method using a roll coater, die coater or blade coater, and screen printing. In the present invention, solvent dilution is preferably employed especially in the case of preparing the coating liquid for forming a pressure-sensitive adhesive layer to impart the above fluidity to the liquid for use.

Intermittent coating is advantageous in that it is easy to increase production speed and improve productivity further.

Intermittent Lamination

At first, as mentioned above, the pressure-sensitive adhesive layer is formed on a release sheet to obtain a continuous belt-shaped pressure-sensitive adhesive layer. In this case, it is preferred to appropriately control the width of the continuous belt-shaped pressure-sensitive adhesive layer to be smaller than that of the electromagnetic wave shielding sheet to be laminated and slightly larger than that of the electroconductive mesh layer. Therefore, when the continuous belt-shaped pressure-sensitive adhesive layer and the continuous belt-shaped electromagnetic wave shielding sheet are laminated to each other, among the four sides of the periphery of the electroconductive mesh layer of the electromagnetic wave shielding sheet, a side of width direction of the continuous-belt shape is exposed, thereby obtaining an earthing area.

When using, among the four sides of the periphery of the mesh layer, not only a side of width direction of the continuous belt shape but also all the four sides of the periphery of the mesh layer as an earthing area, intermittent lamination is conducted to further expose a side of running direction of the continuous belt shape.

Intermittent lamination is conducted in such a manner that the continuous belt-shaped pressure-sensitive adhesive layer which has an appropriately narrower width than that of the electromagnetic wave shielding sheet is cut into a size that allows the four sides of the periphery of the electroconductive mesh layer to be exposed, and concurrently with cutting the sheet, the resulting cut pieces of the sheet are intermittently laminated on the surface of the electroconductive mesh layer of the continuous belt-shaped electromagnetic wave shielding sheet, adjusting the position of the cut sheets.

A laminator used for the intermittent lamination may be any laminator as long as it can apply pressure on the pressure-sensitive adhesive layer and the electromagnetic wave shielding sheet, such as a roll-type laminator and a flat bed laminator. Preferred is a roll-type laminator because it corresponds to roll-to-roll processing, easily prevents bubbles from entering, and enables continuous production.

No particular limitation is imposed on the pressure applied upon lamination. For example, in the case of using a roll-type laminator, a line pressure from 1 to 20 kgf/cm is preferred. No particular limitation is also imposed on the temperature of the area under pressure upon lamination. However, from the viewpoint of damage to the equipment, lower temperature is preferred, which is preferably a temperature from 20° C. to 80° C. However, the temperature may be increased to 80° C. or more as needed.

Upon intermittent lamination, it is preferred to conduct heat and pressure treatment so that the convexoconcaves of the electroconductive mesh layer are completely filled with the pressure-sensitive adhesive layer to prevent air from entering the convexoconcaves, and the surface of the pressure-sensitive adhesive layer is planarized. The condition of the heat and pressure treatment is, for example, conducting the treatment at a pressure from 0.2 to 1.0 MPa and a temperature from 50 to 100° C. for 10 to 90 minutes.

Intermittent lamination is advantageous in that the equipment for intermittent lamination is simpler than that for intermittent coating, and a high yield can be provided. It is also advantageous in that because the pressure-sensitive adhesive layer has the same size as that of the protective film layer thereof, the protective film resists to detachment or strain.

The pressure-sensitive adhesive layer thus formed has an adhesion function; therefore, it is preferred to laminate a temporary protective film such as an easy-peel PET film treated with silicone on the pressure-sensitive adhesive layer, to prevent the pressure-sensitive adhesive layer from improper adhesion until the filter is attached to a display.

Figure 4:
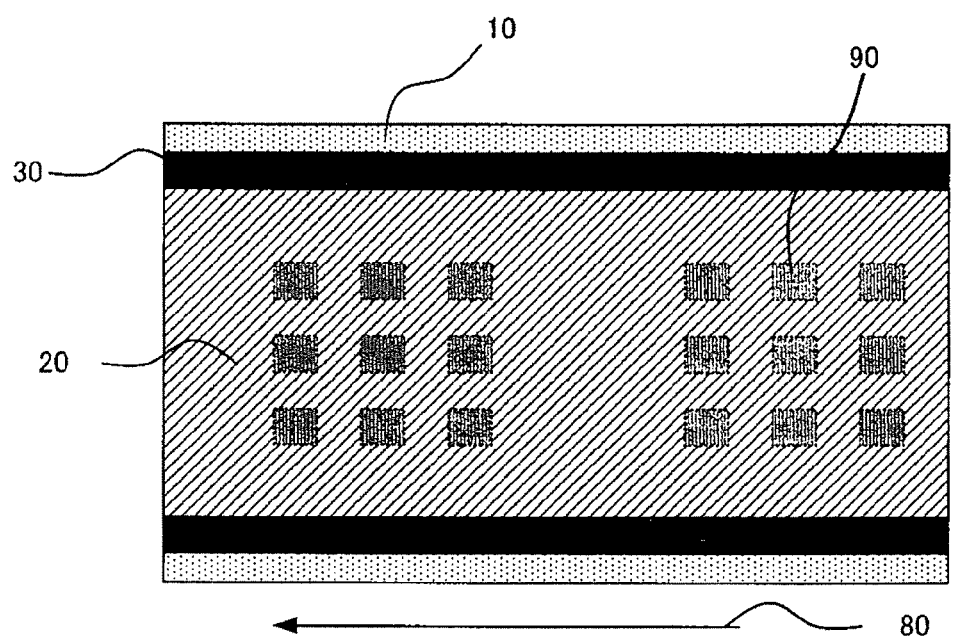
FIG. 4 is a plan view schematically showing an example of the method of producing the near-infrared absorbing filter of the present invention.

When the pressure-sensitive adhesive layer is partially formed for the purpose of, for example, exposing an earthing area of the electroconductive mesh layer in production of the near-infrared absorbing filter by roll-to-roll processing, partial formation of the pressure-sensitive adhesive layer is carried out as follows: in the case of an embodiment (form A) wherein the continuous belt-shaped laminate (laminate film in which the electroconductive mesh layer is laminated on the transparent substrate film) is exposed at one end or both ends thereof in the width direction (in a direction perpendicular to the delivery direction) while the pressure-sensitive adhesive layer is formed as a continuous layer in the longer direction (in the delivery direction) of the laminate, the pressure-sensitive adhesive layer is formed by applying its coating solution in narrower width continuously in the longer direction, for example (see FIG. 4 in which openings 90 of the electroconductive mesh layer present under the pressure-sensitive adhesive layer are indicated by dotted lines).

Figure 5:
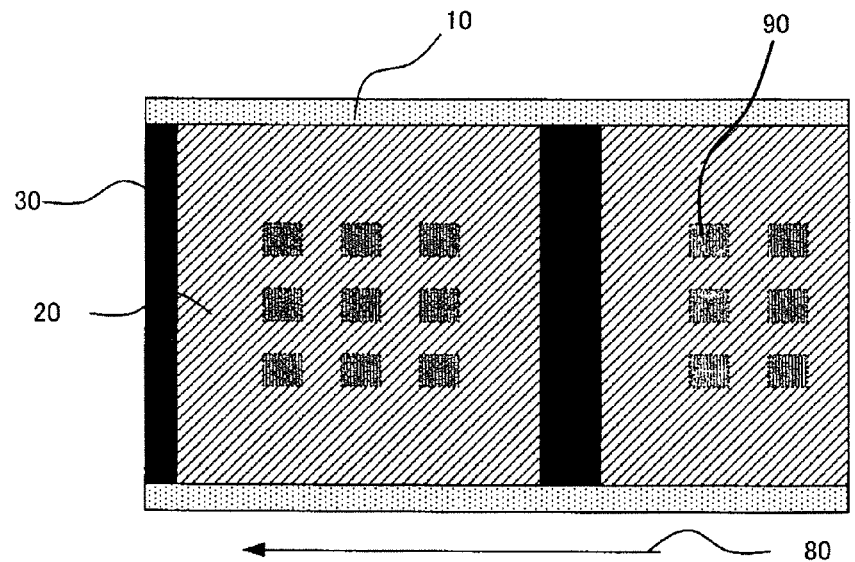
FIG. 5 is a plan view schematically showing a different example of the method of producing the near-infrared absorbing filter of the present invention.

When the pressure-sensitive adhesive layer is partially formed in the form where the continuous belt-shaped laminate is partially exposed across the full width thereof (form B, that is, the form which is different from the form A by 90 degrees in the lengthwise and crosswise relationship), the pressure-sensitive adhesive layer is partially formed by applying its coating solution intermittently such that the pressure-sensitive adhesive layer is not formed in the longer direction so as to expose the corresponding part in the width direction. That is, the coating solution is applied not on the whole area but patternwise. Intermittent coating may be carried out not only by a coating method but also by a printing method including transfer, and a suitable method can be selected from methods known in the art (see FIG. 5).

Figure 6:
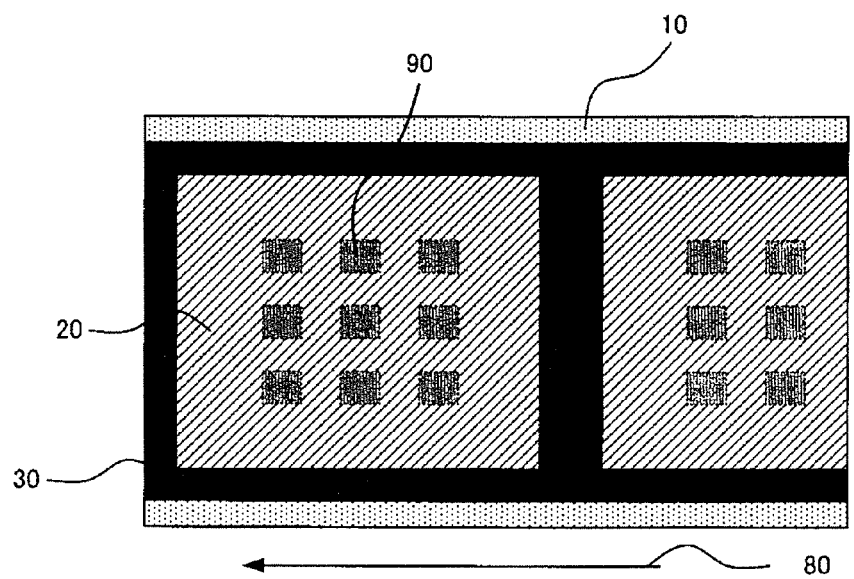
FIG. 6 is a plan view schematically showing a different example of the method of producing the near-infrared absorbing filter of the present invention.

In the most common form wherein the electroconductive mesh layer has a mesh area in the center and an earthing area in the form of a frame around the mesh area, and the earthing area is exposed in the form of a frame (form C), the form A is employed to narrow the width and intermittent coating is also carried out (see FIG. 6).

Figure 7:
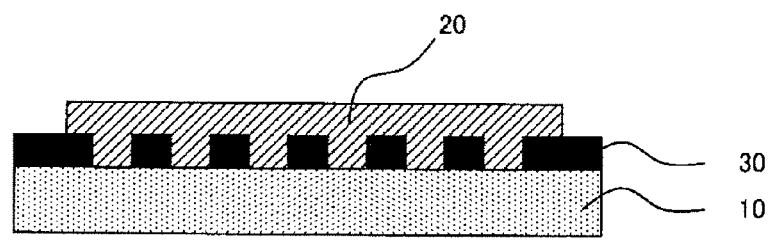
FIG. 7 is a sectional view schematically showing an example of the state of layers of the near-infrared absorbing filter of the present invention.

In the case of partially forming the pressure-sensitive adhesive layer, the pressure-sensitive adhesive layer is also formed at a part of the earthing area, that is, normally at a part of the area inside which is the mesh area-side. The reason is to protect the mechanically-weak mesh area securely even if formed in the position where the layer is not designed to be formed (see FIG. 7).

Figure 8:
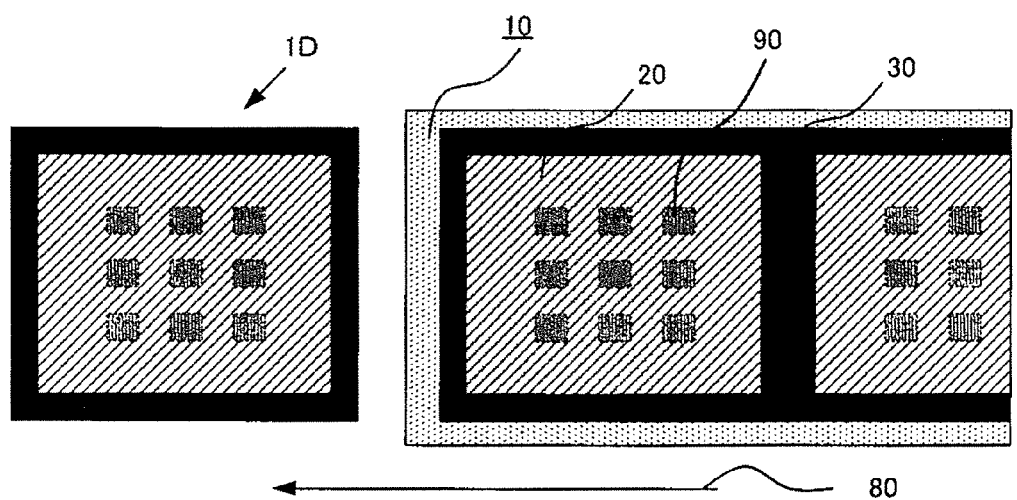
FIG. 8 is a plan view schematically showing a different example of the method of producing the near-infrared absorbing filter of the present invention.

Then, the thus-produced, continuous belt-shaped near-infrared absorbing filter, in which a plurality of one unit of near-infrared absorbing filters are aligned in longitudinal direction, each of the filters corresponding to one unit of display, is cut in the form of a sheet for each unit of the filter. (see FIG. 8).

Properties of Near-Infrared Absorbing Filter (1) Haze

It is preferred that the near-infrared absorbing filter of the present invention have a haze value of 5 or less when a near-infrared absorbing layer of 25 μm in thickness is formed and measured for a haze value in accordance with JIS K7136. The haze value is more preferably 3 or less, particularly preferably 2 or less.

(2) Transparency

The near-infrared absorbing filter of the present invention preferably has a sufficient light transmittance in the visible light region. That is, the near-infrared absorbing filter preferably has a luminous transmittance of 20% or more, more preferably 30% or more in the wavelength range from 380 to 780 nm.

(3) Near-Infrared Absorbing Property

The near-infrared absorbing filter of the present invention preferably has a transmittance of 20% or less, more preferably 15% or less in the near-infrared region, which is the transmittance of near-infrared rays in the wavelength range from 800 nm to 1,100 nm.

(4) Neon Light Absorbing Property

In the case where the near-infrared absorbing filter of the present invention is applied on the front face of a plasma display panel, which is a typical usage thereof, it is preferred that a light transmittance of the neon light which is emitted after a neon atom is excited and returns to the ground state when the plasma display panel emits light using xenon gas discharge, that is, in the wavelength range from 570 to 610 nm, is 50% or less, more preferably 40% or less.

The light transmittance in the present invention can be measured with the use of a spectral photometer (product name: UV-3100PC, manufactured by Shimadzu Corporation) in accordance with JIS-Z8701.

(5) Durability

The near-infrared absorbing filter of the present invention has an optical filter function with excellent durability, and the function resists to changes in spectral characteristics attributed to deterioration of the light absorbing agent even after a long-term use at high temperature and high humidity. Specifically, it is desirable that both differences Δx and Δy in chromaticity (x, y) of the near-infrared absorbing filter before and after the filter is left for 1000 hours in an atmosphere of high temperature (e.g., a temperature of 80° C. and a humidity of 10% or less) or in an atmosphere of high temperature and high humidity (e.g., a temperature of 60° C. and a humidity of 90% RH), be 0.03 or less, more preferably 0.02 or less.

The present invention is not limited by the above-mentioned embodiments. The above-mentioned embodiments are examples, and any that has the substantially same essential features as the technical ideas described in claims of the present invention and exerts the same effects and advantages is included in the technical scope of the present invention.

EXAMPLES

Hereinafter, the present invention will be explained further in detail with reference to examples. The scope of the present invention may not be limited to the following examples, however.

Example 1

An acrylic resin adhesive having an acid number of 6.8 (product name: SK2094, manufactured by Soken Chemical & Engineering Co., Ltd.) was mixed with 10% by weight of a methyl isobutyl ketone (MIBK) dispersion containing 18.5% by weight of cesium tungsten oxide ($Cs_{0.33}WO_3$)(product name: YMF-02, average particle diameter of 50 nm, manufactured by Sumitomo Metal Mining Co., Ltd.), followed by adding 40% by weight of MIBK, and being stirred to prepare a mixture. A curing agent (product name: E-5XM, manufactured by Soken Chemical & Engineering Co., Ltd.) was added to the mixture, thereby obtaining a near-infrared absorbing composition. The composition was applied on a 100 μm-thick, transparent, biaxially oriented PET film A4300 (product name: manufactured by Toyobo Co., Ltd.) and dried to remove a solvent, thereby obtaining a near-infrared absorbing filter.

Example 2

A near-infrared absorbing filter was prepared in the same manner as in Example 1 except that the adhesive used in Example 1 was altered to an acrylic resin adhesive having an acid number of 6.5 (product name: SK1850G, manufactured by Soken Chemical & Engineering Co., Ltd.)

Example 3

A near-infrared absorbing filter was prepared in the same manner as in Example 1 except that the adhesive used in Example 1 was altered to an acrylic resin adhesive having an acid number of 4.5 (product name: SK1888, manufactured by Soken Chemical & Engineering Co., Ltd.)

Example 4

A near-infrared absorbing filter was prepared in the same manner as in Example 1 except that the adhesive used in Example 1 was altered to an acrylic resin adhesive having an acid number of 11.77 (product name: SK2096, manufactured by Soken Chemical & Engineering Co., Ltd.)

Example 5

A near-infrared absorbing filter was prepared in the same manner as in Example 1 except that the adhesive used in Example 1 was altered to an acrylic resin having an acid number of 1.0 (product name: BR-88, manufactured by Mitsubishi Rayon Co., Ltd.)

Example 6

A near-infrared absorbing filter was prepared in the same manner as in Example 1 except that the adhesive used in Example 1 was altered to an acrylic resin having an acid number of 18.5 (product name: BR-77, manufactured by Mitsubishi Rayon Co., Ltd.)

Example 7

The near-infrared absorbing composition of Example 1 was mixed further with 37% by mass of zirconium oxide fine particles having an average particle diameter of 15 nm, thereby obtaining a near-infrared absorbing composition of Example 7. Using the resultant near-infrared absorbing composition, a near-infrared absorbing filter was obtained in the same manner as in Example 1.

Example 8

The near-infrared absorbing composition of Example 1 was mixed further with 37% by mass of zirconium oxide fine particles having an average particle diameter of 50 nm, thereby obtaining a near-infrared absorbing composition of Example 8. Using the resultant near-infrared absorbing composition, a near-infrared absorbing filter was obtained in the same manner as in Example 1.

Comparative Example 1

A near-infrared absorbing filter was prepared in the same manner as in Example 1 except that the adhesive used in Example 1 was altered to an acrylic resin adhesive having an acid number of 0 (product name: SK1435, manufactured by Soken Chemical & Engineering Co., Ltd.)

Comparative Example 2

A near-infrared absorbing filter was prepared in the same manner as in Example 1 except that the adhesive used in Example 1 was altered to an acrylic resin adhesive having an acid number of 0 (product name: SK2137, manufactured by Soken Chemical & Engineering Co., Ltd.)

Comparative Example 3

A near-infrared absorbing filter was prepared in the same manner as in Example 1 except that the adhesive used in Example 1 was altered to an acrylic resin having an acid number of 0.1 (product name: MB2952, manufactured by Mitsubishi Rayon Co., Ltd.)

Comparative Example 4

A near-infrared absorbing filter was prepared in the same manner as in Example 1 except that the adhesive used in Example 1 was altered to an acrylic resin having an acid number of 228 (product name: BR605, manufactured by Mitsubishi Rayon Co., Ltd.)

Evaluation

The above examples and comparative examples were evaluated for the following items. The results are shown in Table 1.

(1) Haze

Each of the near-infrared absorbing filters prepared in Examples and Comparative Examples was measured for haze value by a method in accordance with JIS K7136.

(2) Durability

At first, each near-infrared absorbing filter was measured for chromaticity (x, y) before durability tests. The chromaticity was measured with the use of a spectral photometer (manufactured by Shimadzu Corporation, product name: UV-3100PC).

High-Temperature Durability Test

Each near-infrared absorbing filter was left for 1000 hours in an atmosphere of high temperature (temperature of 80° C., relative humidity of 10% or less) and then measured for chromaticity (x, y) in the same manner as above.

Differences Δx and Δy in chromaticity (x, y) were obtained from the measured values of the chromaticity before and after the filter was left in the atmosphere of high temperature.

High-Temperature and High-Humidity Durability Test

Each near-infrared absorbing filter was left for 1000 hours in an atmosphere of high temperature and high humidity (temperature of 60° C., relative humidity of 90% RH) and then measured for chromaticity (x, y) in the same manner as above.

Differences Δx and Δy in chromaticity (x, y) were obtained from the measured values of the chromaticity before and after the filter was left in the atmosphere of high temperature and high humidity.

The criterion for evaluation is as follows.

0.03 or less: ○ more than 0.03: ×

Measurement of Average Particle Diameter of Cesium Tungsten Oxide Fine Particles and Zirconium Oxide Fine Particles Each near-infrared absorbing composition (pressure-sensitive adhesive layer) was embedded in a resin (two-component curable epoxy resin), trimmed off and polished with the use of an ultra-microtome (a thin slice-cutting device, "EM-FCS" manufactured by Leica Microsystems K.K.) equipped with a diamond knife ("DIATOME ULTRA CRYO DRY" manufactured by Diatome AG) using a cryo-system, followed by dyeing with a metal oxide, thereby preparing an ultra-thin slice. Thereafter, the slice was observed with the use of a transmission electron microscope ("H-7100FA" manufactured by Hitachi, Ltd., accelerating voltage of 100 kV). After taking an electron micrograph of the slice at 120000-fold magnification, 50 particles were selected at random from the cesium tungsten oxide fine particles and also from the zirconium oxide fine particles shown in the electron micrograph to calculate the average particle diameter. When nonspherical particles were found in the selected particles, the major axis of the nonspherical particles were measured for the calculation.

Evaluation of Bluish Reflected Color Tone

Each of the near-infrared absorbing filters prepared in Examples and Comparative Examples, which filters being in the form of a film, was attached onto a black acrylic resin plate with a transparent adhesive (CS-9621 manufactured by Nitto Denko Corporation) and kept for 30 minutes in the condition of 70° C. and 0.5 MPa with the use of an autoclave manufactured by Kyosin Engineering Corporation. Thereafter, each filter was irradiated with an artificial sunlight lamp. The luminance on the acrylic resin plate was set to 2500 lux. The positional relationship between the artificial sunlight lamp, an observer and the acrylic resin plate was such that the acrylic plate was placed horizontally; the observer observed the plate from an upwardly-inclined angle from the plate, at an angle of degree (the angle was measured from the normal of the acrylic resin plate, and so forth); and light was applied from an upwardly-inclined angle from the plate, at an angle of 45 degree. The evaluation was done visually by the observer.

TABLE 1

| | Adhesive | | | | Particle Diameter (nm) | | Bluish Reflected Color Tone |
|---|---|---|---|---|---|---|---|
| | Type | Acid Number | Haze | Durability | Cesium Tungsten Oxide Fine Particles | Zirconium Oxide Fine Particles | |
| Example 1 | SK2094 | 6.8 | 2.2 | ○ | 50 | Not added | Yes |
| Example 2 | SK1850G | 6.5 | 2.0 | ○ | 50 | Not added | Yes |
| Example 3 | SK1888 | 4.5 | 2.4 | ○ | 50 | Not added | Yes |
| Example 4 | SK2096 | 11.7 | 2.0 | ○ | 50 | Not added | Yes |
| Example 5 | BR-88 | 1.0 | 1.8 | ○ | 50 | Not added | Yes |
| Example 6 | BR-77 | 18.5 | 2.0 | ○ | 50 | Not added | Yes |
| Example 7 | SK2094 | 6.8 | 2.2 | ○ | 50 | 15 | Black Reflected Color Tone |
| Example 8 | SK2094 | 6.8 | 2.2 | ○ | 50 | 50 | Yes |
| Comparative Example 1 | SK1435 | 0 | 57 | ○ | 50 | Not added | Yes |
| Comparative Example 2 | SK2137 | 0 | 58 | ○ | 50 | Not added | Yes |
| Comparative Example 3 | MB2952 | 0.1 | 20 | ○ | 50 | Not added | Yes |
| Comparative Example 4 | BR605 | 228 | 2.0 | x | 50 | Not added | Yes |

The invention claimed is:

1. A near-infrared absorbing composition in which, as a near-infrared absorbing agent, composite tungsten oxide fine particles having an average dispersed particle diameter of the composite tungsten oxide fine particles is 800 nm or less and represented by the general formula MwWyOz, wherein element M is one or more elements selected from the group consisting of H, He, alkali metals, alkaline-earth metals, rare-earth metals, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I; W is tungsten; O is oxygen; and $0.001 \leq y \leq 1.1$ and $2.2 \leq z/y \leq 3.0$, are dispersed in a resin which comprises carboxyl groups and has an acid number of 0.6 or more and 30 or less.

2. The near-infrared absorbing composition according to claim 1, wherein the resin is an acrylic resin.

3. The near-infrared absorbing composition according to claim 1, wherein the resin is an adhesive resin.

4. The near-infrared absorbing composition according to according to claim 1, wherein the acid number is 1 or more and 19 or less.

5. The near-infrared absorbing composition according to claim 1, wherein the composite tungsten oxide fine particles have any one or more of a structure selected from the group consisting of a hexagonal crystal structure, a tetragonal crystal structure and a cubic crystal structure.

6. The near-infrared absorbing composition claim 1, wherein element M in the general formula representing the composite tungsten oxide fine particles, MxWyOz, is cesium (Cs), and the composite tungsten oxide fine particles have a hexagonal crystal structure.

7. The near-infrared absorbing composition according to claim 1, wherein surfaces of the composite tungsten oxide fine particles are covered with an oxide comprising one or more elements selected from the group consisting of Si, Ti, Zr and Al.

8. The near-infrared absorbing composition according to claim 1, further comprising zirconium oxide fine particles having a smaller average particle diameter than that of the composite tungsten oxide fine particles.

9. A near-infrared absorbing filter having a near-infrared absorbing layer comprising any of the near-infrared absorbing compositions defined by claim 1.

* * * * *